United States Patent
Shimomura et al.

(10) Patent No.: US 6,831,764 B2
(45) Date of Patent: Dec. 14, 2004

(54) LIGHT SCANNING DEVICE AND IMAGE FORMING APPARATUS USING THE SAME

(75) Inventors: Hidekazu Shimomura, Kanagawa (JP); Hiroshi Sato, Tochigi (JP); Manabu Kato, Tochigi (JP); Keiichiro Ishihara, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/162,871

(22) Filed: Jun. 6, 2002

(65) Prior Publication Data

US 2003/0053185 A1 Mar. 20, 2003

(30) Foreign Application Priority Data

Jun. 12, 2001 (JP) .................................... 2001-177307

(51) Int. Cl.[7] .............................................. G02B 26/08
(52) U.S. Cl. ....................... 359/207; 359/205; 347/244; 347/259
(58) Field of Search ................................. 359/205, 207; 347/232, 233, 241, 244, 256–261

(56) References Cited

U.S. PATENT DOCUMENTS

| | | | |
|---|---|---|---|
| 5,111,219 A | 5/1992 | Makino | 346/108 |
| 5,619,362 A | 4/1997 | Ota | 359/205 |
| 5,781,323 A | 7/1998 | Takada et al. | 359/206 |
| 5,812,181 A | 9/1998 | Ishibe | 347/258 |
| 5,883,732 A | 3/1999 | Takada et al. | 359/207 |
| 6,222,662 B1 | 4/2001 | Suzuki et al. | 359/205 |
| 2003/0025784 A1 | 2/2003 | Sato et al. | 347/244 |

FOREIGN PATENT DOCUMENTS

| | | |
|---|---|---|
| EP | 730182 | 9/1996 |
| EP | 1139142 | 10/2001 |
| JP | 4-50908 | 2/1992 |
| JP | 7-174998 | 7/1995 |
| JP | 9-33850 | 2/1997 |

*Primary Examiner*—Audrey Chang
*Assistant Examiner*—Denise S. Allen
(74) *Attorney, Agent, or Firm*—Fitzpatrick, Cella, Harper & Scinto

(57) ABSTRACT

It is an object of this invention to provide a light scanning device capable of suppressing scanning line bending to a low level, which is caused by the arrangement error of a single-element lens serving as an imaging optical element, and an image forming apparatus using the device. In order to achieve the object, according to this invention, an imaging optical system is formed from a single-element lens, and the sectional shapes of the incident and exit surfaces in the main scanning direction are non-arcuated, and the power in the sub scanning direction substantially concentrates on the exit surface. The non-arcuated shape (curvature) of the exit surface in the main scanning direction is so determined as to make the magnification in the sub scanning direction uniform.

32 Claims, 18 Drawing Sheets

LIGHT SCANNING DEVICE AND IMAGE FORMING APPARATUS USING THE SAME

BACKGROUND OF THE INVENTION

1. Field of the Invention

The present invention relates to a light scanning device and an image forming apparatus using the same and, more particularly, to a light scanning device which is suitable for a laser beam printer or digital copying apparatus which has, for example, an electrophotographic process of reflecting/deflecting (deflecting/scanning) a light beam, optically modulated and emitted from a light source means, by using a deflecting element formed from a rotating polyhedral mirror or the like, and recording image information by optically scanning a surface to be scanned through an imaging optical system having f-θ characteristics.

2. Description of Related Art

In a conventional scanning optical device for a laser beam printer (LBP) or the like, the light beam which is optically modulated in accordance with an image signal and emitted from a light source means is cyclically deflected by a light deflector formed from, e.g., a rotating polyhedral mirror (polygon mirror), and the light beam is focused into a spot on the surface of a photosensitive recording medium (photosensitive drum) and optically scanned on the surface by an imaging optical system having f-θ characteristics.

FIG. 11 is a schematic view showing the main part of a conventional light scanning device.

Referring to FIG. 11, the divergent light beam emitted from a light source means 71 is converted into a substantially parallel light beam by a collimator lens 72, and the light beam is limited by a stop 73 to be incident on a cylindrical lens 74 having predetermined refracting power only in the sub scanning direction. Of the substantially parallel light beam incident on the cylindrical lens 74, the light in a main scanning section emerges without any change. The light in a sub-scanning section is focused and substantially formed into an almost line image on a deflecting surface (reflecting surface) 75a of a light deflector 75.

The light beam reflected/deflected by the deflecting surface 75a of the light deflector 75 is guided onto the photosensitive drum surface 78 serving as a surface to be scanned through an imaging optical system (f-θ lens system) 76 having f-θ characteristics. By rotating the light deflector 75 in the direction indicated by an arrow A, a photosensitive drum surface 78 is optically scanned to record image information.

In such a light scanning device, in order to record high-resolution image information, for example, the following requirements need to be satisfied. The curvature of the image surface is properly corrected throughout the surface to be scanned. Distortion characteristics (f-θ characteristics) with uniform velocity characteristics are set between a scanning angle θ and an image height in the Y direction. A spot diameter on the image surface at each image height is uniform. Conventionally, various types of light scanning devices that satisfy such optical characteristics or correction optical systems (f-θ lenses) have been proposed.

As laser beam printers and digital copying apparatuses have decreased in size and cost, similar requirements are imposed on light scanning devices.

As an arrangement that satisfies such requirements, a light scanning device having an f-θ lens formed from a single lens is disclosed in, for example, Japanese Patent Application Laid-Open Nos. 4-50908 and 9-33850.

According to Japanese Patent Application Laid-Open No. 4-50908, a high-order aspherical surface is used in the main scanning direction of an f-θ lens to relatively properly correct aberration characteristics. However, since the magnification in the sub scanning direction between a light deflector and a surface to be scanned is not uniform, the spot diameter in the sub scanning direction tends to change with a change in image height.

According to Japanese Patent Application Laid-Open No. 9-33850, the curvatures of at least two of the lens surfaces of an f-θ lens in the light scanning device in the sub scanning direction continuously change at the effective portion of an imaging lens along the main scanning direction independently of the curvature in the main scanning direction. This makes it possible to control the position of the principal plane in the sub scanning direction by bending the two surfaces and make the sub scanning magnification at each image height uniform, thereby making the spot diameter uniform.

In the above proposal, in order to make the sub scanning magnification uniform, the position of the principal plane is so controlled as to make the main scanning uniform by bending at least two surfaces. Although this allows completely independent setting of a main scanning shape and sub scanning shape, requirements such as suppression of an increase in lens thickness tend to make the lens shape in the main scanning direction have a relatively large aspherical surface amount.

A lens having a large aspherical surface amount in the main scanning direction like the one described above is subjected to considerable deteriorations in optical performance due to the arrangement errors of the respective lens surfaces and lens. Of the deteriorations in optical performance, scanning line bending in the sub scanning direction, in particular, cannot be corrected by adjusting mirrors and the like arranged in the device body, unlike scanning line height deviation, scanning line inclination, and the like. This therefore poses a serial problems. In order to suppress scanning line bending to a low level, the respective lens surfaces and the lens need to be arranged with high precision in accordance with design values or an adjusting mechanism needs to be provided for the lens to adjust the arrangement according to the design values.

FIG. 13 is a graph in which a scanning line bending amount is plotted at each image height, with an optical axis regarded as an origin, in the scanning lens disclosed as the first embodiment (FIG. 12) in Japanese Patent Application Laid-Open No. 9-33850 when each surface and the lens block are decentered by 50 μm in the Z direction (a direction perpendicular to the optical axis and the main scanning direction). In FIG. 12, the reference characters S1 to S8 respectively identify a light source, a collimator lens incident surface (plane), a collimator lens exit surface, a cylinder lens incident surface (plane), a cylinder lens exit surface, a deflection surface, a scanning lens incident surface and a scanning lens exit surface. In FIGS. 13 and 14, Block, R1, R2 respectively refer to a lens, an incident surface and an exit surface. FIG. 14 shows the scanning line bending amounts in a case wherein each surface and the lens block are tilted by 3' around a straight line (rotation axis) which passes through the respective surface vertexes (the surface vertex on the incident side of the lens in the case of the lens block) and is parallel to the main scanning direction.

In a scanning lens of a type which has a large aspherical surface amount in the main scanning direction and also has power in the sub scanning direction on the two surfaces, a very large scanning line bending amount is produced by decentering in the Z direction. In addition, the scanning line bend sensitivity level with respect to a tilt is high. Obviously, therefore, even if the performance of the lens is compensated in terms of design, the lens does not reach a practical level when it actually processed and mounted in a housing.

In a color image forming apparatus in which light scanning devices are respectively arranged in correspondence with four photosensitive devices (photosensitive drums), and latent images are formed on them by laser beams to form Y (yellow), M (magenta), C (cyan), and Bk (black) original images on the corresponding photosensitive device surfaces, since the four color images, i.e., the Y, M, C, and Bk images, formed on the respective photosensitive device surfaces are superimposed on a transfer medium such as a paper sheet, if scanning lines of the light scanning devices corresponding to the respective photosensitive devices bend, errors are produced in the shapes of the scanning lines among four colors. This causes color misregistration on the image on the transfer medium, and hence results in a considerable deterioration in image quality.

SUMMARY OF THE INVENTION

The present invention has been made to solve the above problems, and has as its object to provide a light scanning device which has an f-θ lens formed from a single lens, and can suppress scanning line bending caused by the arrangement error of the lens to a low level by properly correcting image surface bending characteristics as characteristics of an optical system, f-θ characteristics for uniform velocity scanning, and wave aberration and optimally shaping the f-θ lens, and an image forming apparatus using the device.

An object of the present invention is to provide a light scanning device having an imaging optical system for guiding a light beam emitted from light source means to a deflecting element, and forming the light beam deflected by the deflecting element into an image on a surface to be scanned, characterized in that, the imaging optical system is formed from a single lens, sectional shapes of an incident surface and an exit surface of the single lens in a main scanning direction are non-arc shapes, power of the exit surface in a sub scanning direction satisfies $0.9 \leq \phi s2/\phi s \leq 1.1$ where $\phi s$ is power of the overall imaging optical system in the sub scanning direction and $\phi s2$ is power of the exit surface in the sub scanning direction, and the non-arc shape of the exit surface in the main scanning direction satisfies $$0.9 \times \frac{L_{bo}}{L_{ao}} \leq \frac{L_{b\theta}}{L_{a\theta}} \leq 1.1 \times \frac{L_{bo}}{L_{ao}}$$

where $L_{ao}$ is an equivalent air distance from the deflecting means on an optical axis to the exit surface of the single lens, $L_{bo}$ is a distance from the exit surface of the single lens to the surface to be scanned, $L_{a\theta}$ is an equivalent air distance from the deflecting means at an off-axis position to the exit surface of the single lens, and $L_{b\theta}$ is a distance from the exit surface of the single lens to the surface to be scanned.

In the present invention, it is preferable that the power of the exit surface in the sub scanning direction or/and the power of the incident surface in the sub scanning direction changes without correlation to a shape in the main scanning direction.

In the present invention, it is preferable that a radius of curvature of the exit surface in the sub scanning direction changes from an on-axis position to an off-axis position.

In the present invention, it is preferable that the incident and exit surfaces are anamorphic surfaces.

In the present invention, it is preferable that a shape of the incident surface in the sub scanning direction is flat or arc, and a shape of the exit surface in the sub scanning direction is arc.

In the present invention, it is preferable that a distance L from a deflection point where the light beam from the light source means is deflected by the deflecting means to the surface to be scanned satisfies $1.2f<L<1.45f$ where f is a focal length of the imaging optical system.

In the present invention, it is preferable that there is no inflection point in a curvature change on a surface of the lens shape of the imaging optical system in the main scanning direction, which uses an aspherical surface.

In the present invention, it is preferable that the imaging optical system is manufactured by plastic molding.

In the present invention, it is preferable that a multi-beam laser is used as a light source of the imaging optical system.

In the present invention, it is preferable that the power of the exit surface in the sub scanning direction satisfies $0.95 \leq \phi s2/\phi s \leq 1.05$ where $\phi s$ is power of the overall imaging optical system in the sub scanning direction and $\phi s2$ is power of the exit surface in the sub scanning direction.

In the present invention, it is preferable that the non-arc shape of the exit surface in the main scanning direction satisfies $$0.95 \times \frac{L_{bo}}{L_{ao}} \leq \frac{L_{b\theta}}{L_{a\theta}} \leq 1.05 \times \frac{L_{bo}}{L_{ao}}$$

where $L_{ao}$ is the equivalent air distance from the deflecting means on the optical axis to the exit surface of the single lens, $L_{bo}$ is the distance from the exit surface of the single lens to the surface to be scanned, $L_{a\theta}$ is the equivalent air distance from the deflecting means at an off-axis position to the exit surface of the single lens, and $L_{b\theta}$ is the distance from the exit surface of the single lens to the surface to be scanned.

In the present invention, it is preferable that the shape of the exit surface of the single lens is an arc shape.

In the present invention, it is preferable that the shape of the incident surface of the single lens within a sub scanning section is flat.

Further object of the present invention is to provide an image forming apparatus comprising the above-described light scanning device, a photosensitive device placed on the surface to be scanned, a developing device for developing an electrostatic latent image formed on the photosensitive body by a light beam scanned by the scanning optical device as a toner image, a transferring device for transferring the developed toner image onto a transfer medium, and a fixing device for fixing the transferred toner image on the transfer medium.

Further object of the present invention is to provide an image forming apparatus comprising the above-described light scanning device, and a printer controller for converting code data input from an external device into an image signal, and inputting the signal to the scanning optical device.

Further object of the present invention is to provide an image forming apparatus comprising a plurality of the above-described light scanning devices, each of the light scanning devices recording image information on photosensitive devices corresponding to each color.

Further object of the present invention is to provide a light scanning device having an imaging optical system for guiding a light beam emitted from light source means to a deflecting element, and forming the light beam deflected by the deflecting element into an image on a surface to be scanned, characterized in that, the imaging optical system is formed from a single lens formed by a molding process, sectional shapes of an incident surface and an exit surface of the single lens in a main scanning direction are non-arc shapes, power of the exit surface in a sub scanning direction satisfies $0.9 \leq \phi s2/\phi s \leq 1.1$ where $\phi s$ is power of the overall imaging optical system in the sub scanning direction and $\phi s2$ is power of the exit surface in the sub scanning direction, and the non-arc shape of the exit surface in the main scanning direction satisfies $$0.9 \times \frac{L_{bo}}{L_{ao}} \leq \frac{L_{b\theta}}{L_{a\theta}} \leq 1.1 \times \frac{L_{bo}}{L_{ao}}$$

where $L_{ao}$ is an equivalent air distance from the deflecting means on an optical axis to the exit surface of the single lens, $L_{bo}$ is a distance from the exit surface of the single lens to the surface to be scanned, $L_{a\theta}$ is an equivalent air distance from the deflecting means at an off-axis position to the exit surface of the single lens, and $L_{b\theta}$ is a distance from the exit surface of the single lens to the surface to be scanned.

DETAILED DESCRIPTION OF THE PREFERRED EMBODIMENTS

In order to solve the problems in the present invention, it is important to
   make the sub scanning magnification of a scanning lens substantially uniform within an image effective area, and
   make the sub scanning magnification at each of the image heights of the incident and exit surfaces of the scanning lens substantially uniform.

When the entire scanning lens is decentered in a direction (Z direction) perpendicular to the surface to be scanned due to an error in mounting the lens in an optical box (housing) and the manufacturing error of the lens itself, the sub scanning magnification of the scanning lens is made substantially uniform to uniformly shift the scanning line on the surface to be scanned, thereby eliminating scanning line bending due to the decentering.

In a molded lens, in particular, when the exit surface is decentered in the Z direction relative to the incident surface due to insufficient assembly precision in the mold, scanning line bending due to the decentering on the surface to be scanned can be eliminated by making the sub scanning magnification on each surface of the scanning lens substantially uniform.

According to a specific method of achieving these effects, which is characteristic to the present invention,
   the exit surface of the scanning lens is made to have almost all the power in the sub scanning direction, and
   the shape of the exit surface of the scanning lens in the sub scanning direction is so determined as to make the sub scanning magnification substantially uniform within an image effective area.

Figure 15:
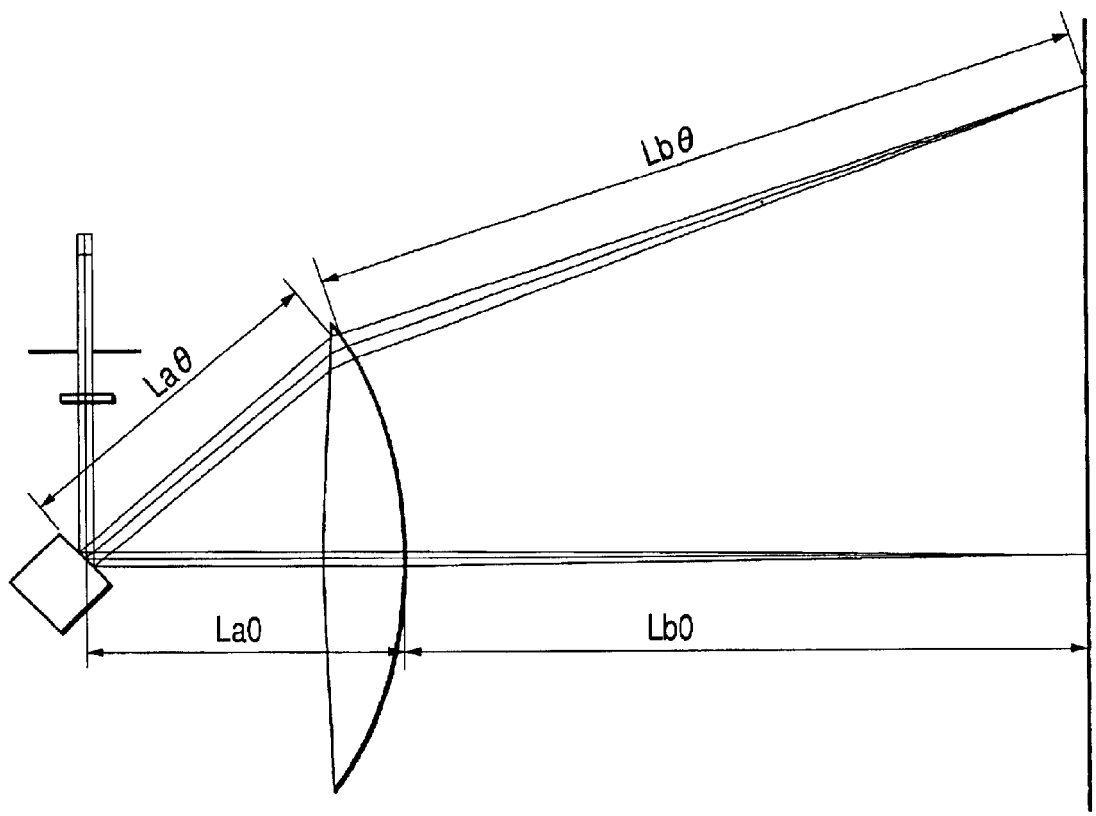
FIG. 15 is a sectional view for explaining relationship with an optical path length for making the sub scanning magnification uniform.

The main scanning shape which makes the sub scanning magnification uniform is the surface shape by which the ratio between the equivalent air distance (calculated in terms of real distance/refraction factor inside the lens) from the polygon deflecting surface to the scanning lens exit surface and the distance from the exit surface to the surface to be scanned is made substantially uniform ($L_{bo}/L_{ao} \cong L_{b\theta}/L_{a\theta}$) and corresponds to a substantially circular optical surface having a curvature center on the deflector side, as shown in FIG. 15. By setting almost all the power in the sub scanning direction on this surface, the sub scanning magnification of the scanning lens is made substantially uniform within the image effective area, and the sub scanning magnifications on the incident and exit surfaces are also made substantially uniform.

With this technique, a scanning optical system which can prevent scanning line bending even if the overall scanning lens and each optical surface are decentered can be realized at low cost by using a single lens. This scanning optical device is especially suitable for a scanning optical system in a color image forming apparatus using a plurality of such devices. When the device is applied to this apparatus, an image with little color misregistration caused by scanning line bending can be obtained without adjusting the scanning line bending.

The present invention will be described in detail below based on the embodiments shown in the accompanying drawings.

First Embodiment

Figure 1:
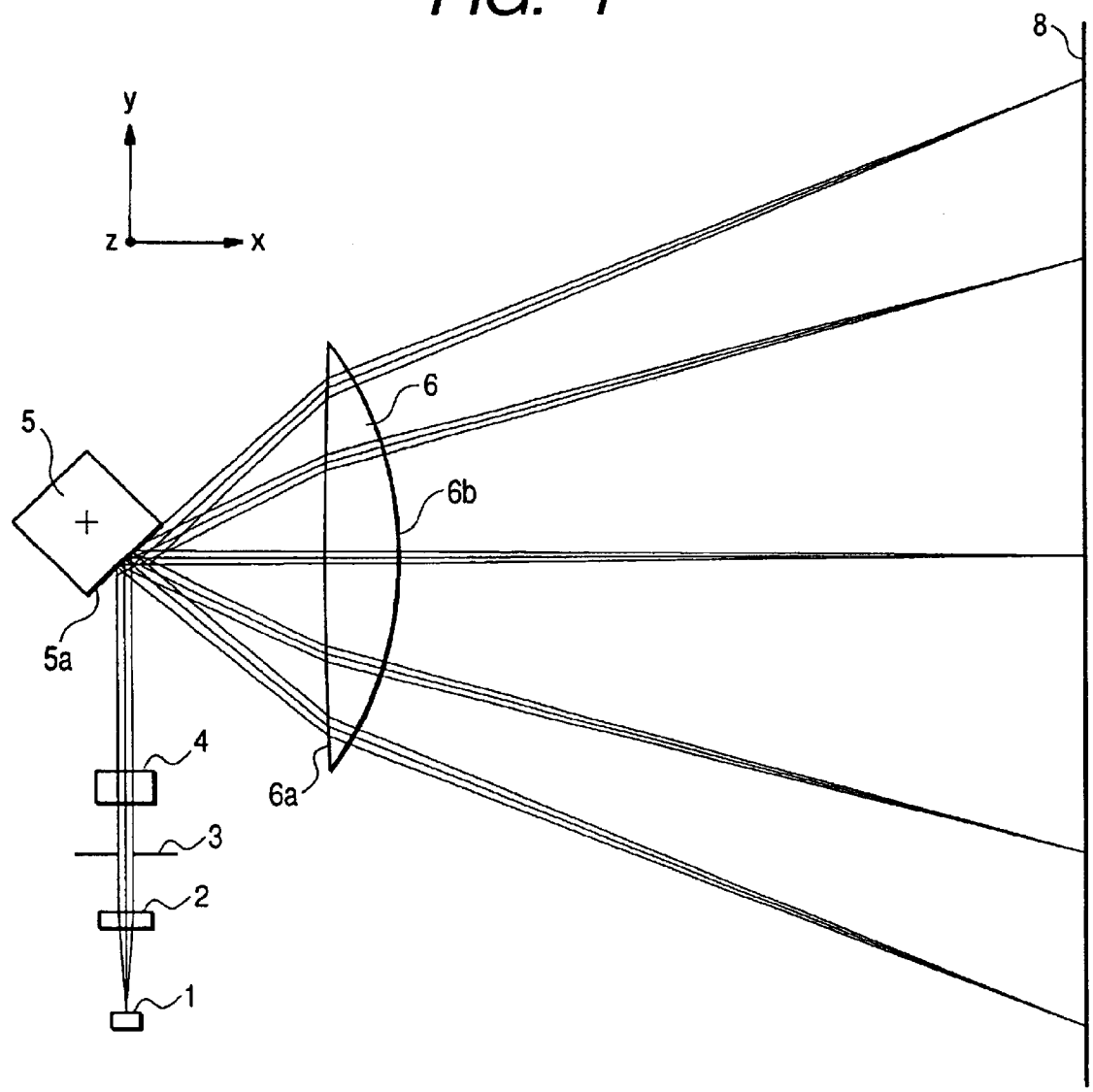
FIG. 1 a sectional view showing the main part of a light scanning device according to the present invention.

FIG. 1 is a sectional view showing the main part of a light scanning device, which is most indicative of the characteristic features of the present invention. The divergent light beam emitted from a semiconductor laser 1 serving as a light source is converted into a substantially parallel light beam by a collimator lens 2, and the diameter of the light beam is limited by a stop 3 to obtain a desired spot diameter. A rotating polyhedral mirror (polygon mirror) 5 scans the light beam from the light source means toward a surface to be scanned. Reflected light from the polygon mirror is formed into a small light spot throughout the scanning area by a scanning imaging lens 6. The scanning imaging lens 6 needs to have f-θ characteristics to covert a light beam at a uniform angular velocity which is deflected by the polygon mirror into a light beam at a uniform velocity. In addition, the parallel light beam is temporarily focused on the polygon mirror in the sub scanning direction by the cylindrical lens 4, and the polygon mirror and the surface to be scanned are made to have an optically conjugate relationship in a sub scanning section, thereby realizing optical face tangle error correction of the polygon mirror.

The scanning imaging lens 6 used in this case will be described in detail below. The scanning imaging lens 6 is a plastic lens made of optical resin ZEONEX E48R (available from Zeon Corporation).

In this embodiment, the scanning imaging lens 6 is formed by a molding process.

The aspherical surface shape of this lens in the main scanning direction is determined such that only the exist surface side has power in the sub scanning direction and the sub scanning magnification is made uniform, thereby realizing an optical system free from scanning line bending due to surface decentering in the Z direction in a molding process.

A method of determining the shape of an exit surface in the main scanning direction, which is especially important, will be described in detail below.

In this embodiment, since only the exit surface side is made to have power in the sub scanning direction, the sub scanning magnification at each image height cannot be made uniform by controlling the positions of the main flat surface in the sub scanning direction by using the bending of the two surfaces as described in the prior art. For this reason, the aspherical surface shape in the main scanning direction must be determined to satisfy the relational expression for sub scanning magnification uniformity given below.

Figure 2:
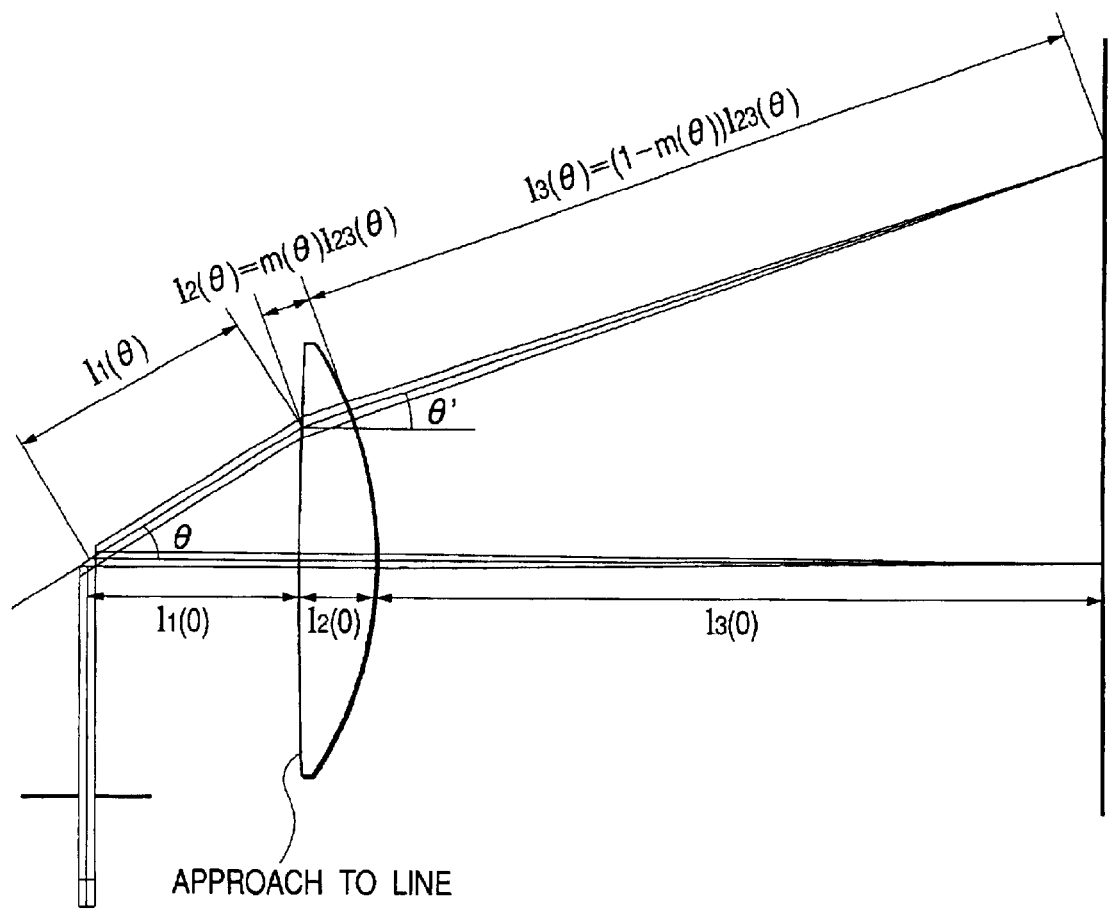
FIG. 2 is a view for explaining symbols used in mathematical expressions for determining the main scanning shape on the exit surface side.

(see FIG. 2 for the symbols used in the following description)

Sub scanning magnification uniformity:

$$L_3(\theta)/\{L_1(\theta)+L_2(\theta)/n\}=\text{const}=|\beta| \quad (1)$$

where θ is the deflection angle, $L_1(\theta)$ is the distance from a deflection point to the incident surface of the lens at the deflection angle θ, $L_2(\theta)$ is the distance from the incident surface of the lens to the exit surface at the deflection angle θ, $L_3(\theta)$ is the distance from the exit surface of the lens to the surface to be scanned at the deflection angle θ, n is the refraction factor of the lens, and β is the sub scanning magnification.

If the sub scanning magnification is made uniform by adjusting the shape in the main scanning direction in this manner, the main scanning shape of the exit surface on which power in the sub scanning direction is concentrated becomes a convex shape that is greatly bent toward the deflector side.

On the exist surface, therefore, a scanning beam does not greatly bend, and the f-θ characteristics are corrected mainly by the incident surface. This shape does not have a large bending amount in the optical axis direction, and may be made to approach to a line in determining the aspherical surface shape of the exit surface.

f-θ characteristics:

$$L_1(0)\cdot\tan\theta+\{L_2(0)+L_3(0)\}\cdot\tan\theta'=f\theta \quad (2)$$

where $L_1(0)$ is the distance from a deflection point to the incident surface of the lens on the optical axis, $L_2(0)$ is the distance from the incident surface of the lens to the exit surface on the optical axis (lens thickness), $L_3(0)$ is the distance from the exit surface of the lens to the surface to be scanned on the optical axis, f is the focal length of the scanning lens in the main scanning direction, and θ' is the angle defined by the light ray refracted by the incident surface of the lens and the optical axis of the lens.

When $L_1(0)$, $L_2(0)$, and β are determined, $L_3(0)$ is obtained according to equation (1). With the focal length f of the lens in the main scanning direction, θ' corresponding to each deflection angle θ is obtained as follows:

$$\theta'=\tan^{-1}[\{f\theta-L_1(0)\cdot\tan\theta\}/\{L_2(0)+L_3(0)\}] \quad (3)$$

With $L_2(\theta)=m(\theta)\cdot L_{23}(\theta)$ and $L_3(\theta)=\{1-m(\theta)\}\cdot L_{23}(\theta)$, equation (1) can be modified as follows. The main scanning aspherical surface shape of the exit surface can be obtained by substitution of θ' obtained by equation (3).

$$m(\theta)=\{L_{23}(\theta)-|\beta|\cdot L_1(\theta)\}/\{L_{23}(\theta)\cdot(1+|\beta|/n)\} \quad (4)$$

$$L_1(\theta)=L_1(0)/\cos(\theta) \quad (5)$$

$$L_{23}(\theta)=L_{23}(0)/\cos(\theta')=\{L_2(0)+L_3(0)\}/\cos(\theta') \quad (6)$$

Tables 1 to 5 show the lenses having undergone optimization such as image surface bending correction based on the solution obtained by the above procedures within predetermined conditions for sub scanning magnification. In this case, the lenses expressed by general aspherical surface expressions to be described below.

Provided that each anamorphic shape constituting the scanning imaging lens 6 in each of Tables 1 to 5 in this embodiment is an aspherical surface shape expressed by functions up to a 10th-order function in the main scanning direction, the intersection between each optical element surface and the optical axis is regarded as an origin, and the optical axis direction, a direction perpendicular to the optical axis within a main scanning section, and a direction perpendicular to the optical axis within a sub scanning section respectively correspond to the x-axis, the y-axis, and the z-axis, the meridional direction corresponding to the main scanning direction is expressed by $$X = \frac{y^2/R}{1+\sqrt{1-(1+k)(y/R)^2}} + B_4 y^4 + B_6 y^6 + B_8 y^8 + B_{10} y^{10}$$

where R is the meridional radius of curvature, and K, $B_4$, $B_6$, $B_8$, and $B_{10}$ are aspherical coefficients.

The sagittal direction corresponding to the sub scanning direction (the direction which includes the optical axis and is perpendicular to the main scanning direction) is expressed by $$S = \frac{Z^2/r'}{1+(1-(Z/r')^2)^{1/2}}$$

for $r'=r0(1+D_2 Y^2+D_4 Y^4+D_6 Y^6+D_8 Y^8+D_{10}Y^{10}$ where r is the sagittal radius of curvature, and $D_2$, $D_4$, $D_6$, $D_8$, and $D_{10}$ are sagittal change coefficients.

Although not described in detail, in order to properly correct image surface bending and f-θ characteristics in the main scanning direction in a paraxial area, the distance from a deflection point to the surface to be scanned must be set to 1.38 times the focal length of a scanning lens. If, however, an aspherical surface is used in the main scanning direction, this value need not always be satisfied. When aspherical surfaces are used as both an incident surface and an exit surface, the distance from the deflection point to the surface to be scanned can be shortened as compared with other structures. In a lens like that of this embodiment, in which the main scanning shape on the exit surface side is greatly bent, in particular, if the surface is arcuated, the lens becomes thick, resulting in an increase in cost. In addition, if the two surfaces are aspherical, the degree of freedom in design increases, and image surface bending and f-θ characteristics can be corrected further properly. In order to achieve a reduction in the size of the apparatus (a reduction in cost) and an improvement in performance, the main scanning shapes of the two surfaces are preferably aspherical.

In this numerical embodiment, a surface whose sub scanning shape is changed without any correlation with the main scanning shape is used for the following reasons.

For example, a surface whose sub scanning shape correlates with the main scanning shape is obtained by rotating a meridional shape about a straight line which is included in a deflecting surface and is parallel to the main scanning direction. When such a surface is applied to an exit surface in this numerical embodiment, the radius of curvature in the sub scanning direction is maximized on the optical axis, and gradually decreases with an increase in distance from the optical axis. For this reason, the sub scanning power becomes excessively strong at a scanning end, and image surface under-bending occurs. Consequently, as in this embodiment, image surface bending can be properly corrected by changing the sub scanning shape without any correlation with the main scanning shape and gradually increasing the radius of curvature in the sub scanning direction from the optical axis to the periphery.

In addition, the surface whose sub scanning curvature changes along the main scanning direction is preferably the exit surface on which power concentrates. In order to make the sub scanning magnification uniform, it is sufficient to change only one surface. Since the width of a light beam in the sub scanning direction is generally small, a sufficient aberration correcting effect can be obtained by forming the sub scanning sectional shape into an arcuated shape instead of a complicated aspherical surface shape.

The use of an aspherical surface shape as a sub scanning sectional shape leads to difficulty in processing the lens and a considerable deterioration in performance due to the arrangement error of the lens and the like, and hence is preferably avoided.

In the present invention, since the shapes of both the incident surface and the exit surface in a sub scanning section are not arcuated, a deterioration in performance caused by the Z direction shift of the exit surface with respect to the incident surface due to the arrangement error of the lens and insufficient assembly precision of the molded lens in the mold can be reduced.

Table 6 shows the values of the respective items obtained by logical expressions (1) to (6), the results obtained by tracing actual shapes, and the errors therebetween in the embodiment shown in Table 1.

Figure 3:
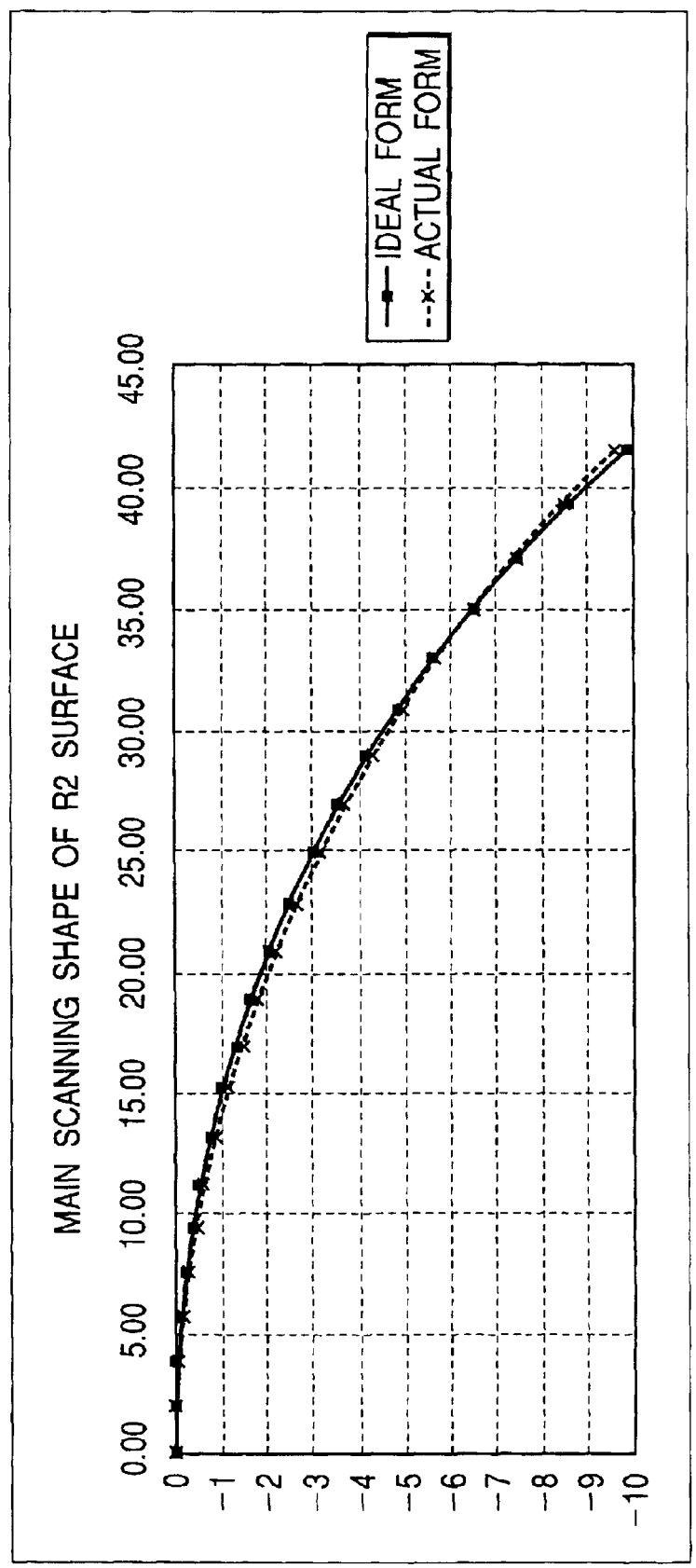
FIG. 3 is a graph showing a main scanning shape obtained by a logical expression and an actual main scanning shape.
Figure 4A:
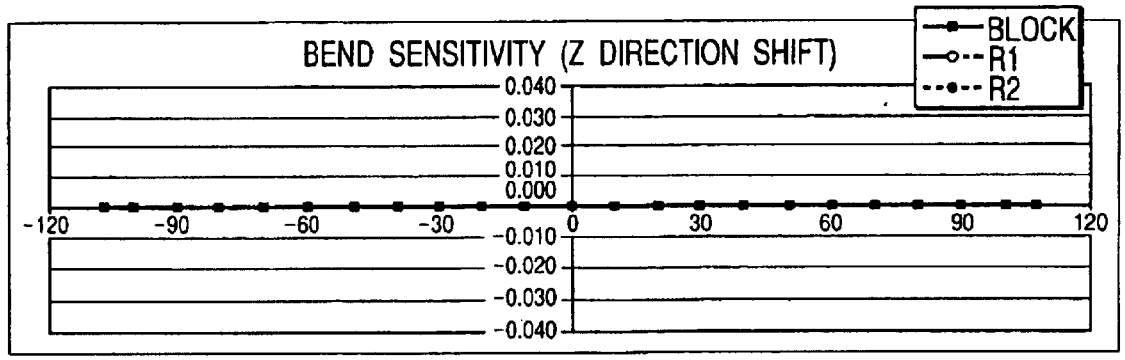
FIGS. 4A, 4B, 4C, 4D and 4E are graphs showing the bend sensitivity levels of the scanning lenses specified in Tables 1 to 5 with respect to Z direction shifts.
Figure 4B:
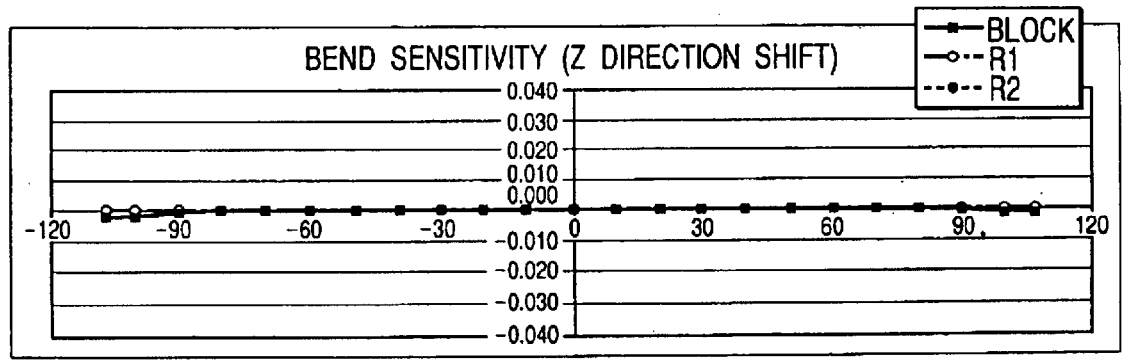
Figure 4C:
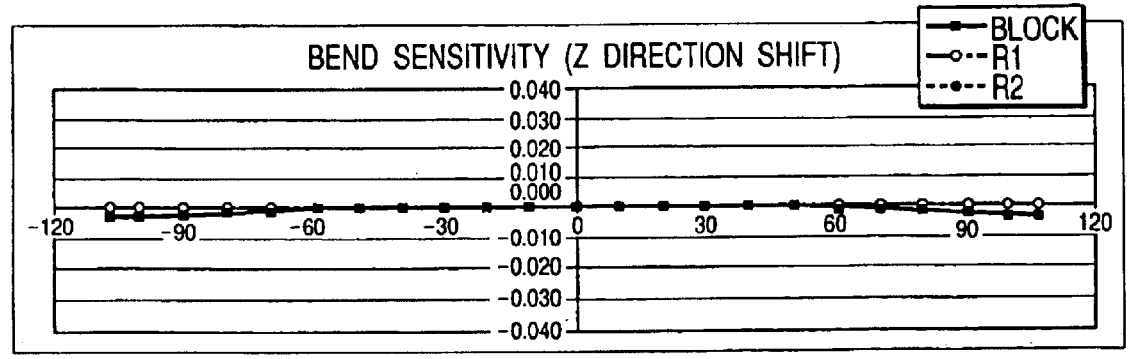
Figure 4D:
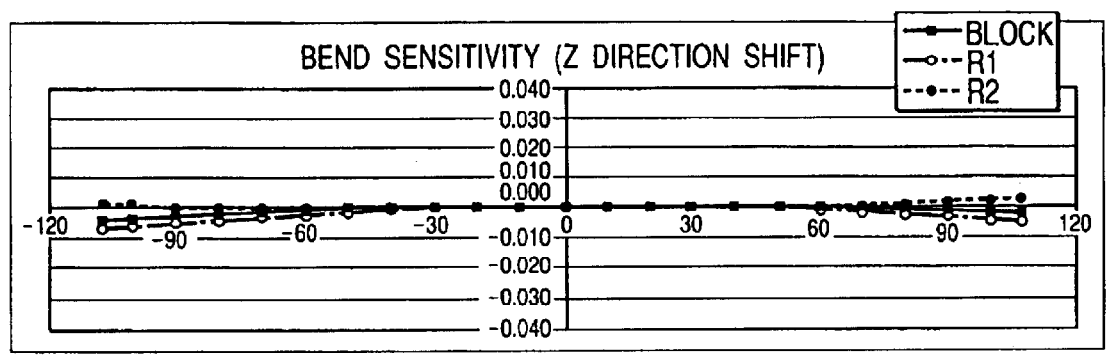
Figure 4E:
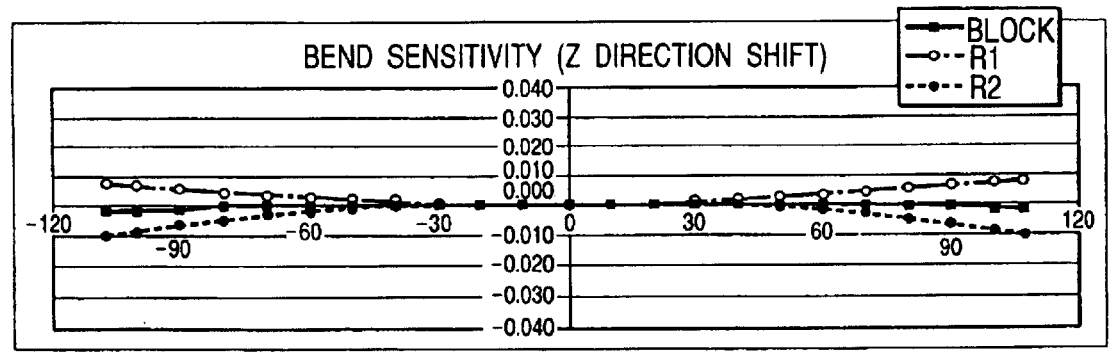
Figure 5A:
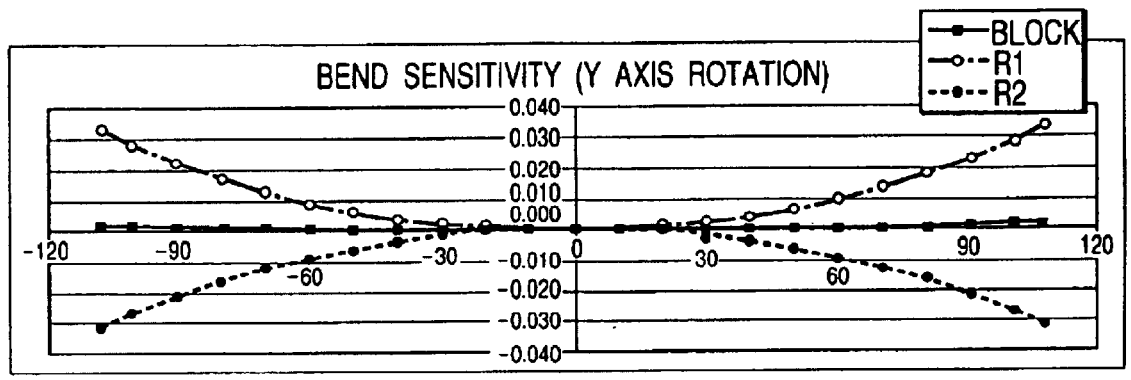
FIGS. 5A, 5B, 5C, 5D and 5E are graphs showing the bend sensitivity levels of the scanning lenses specified in Tables 1 to 5 with respect to rotations around an axis parallel to the main scanning direction.
Figure 5B:
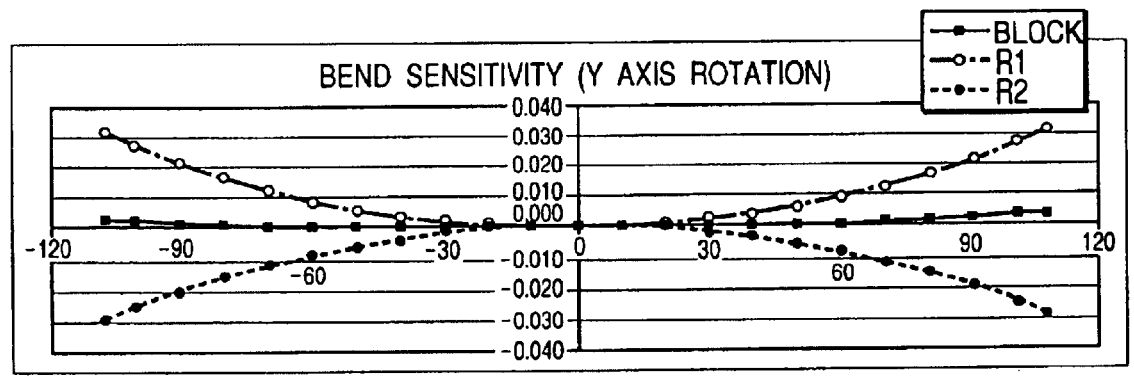
Figure 5C:
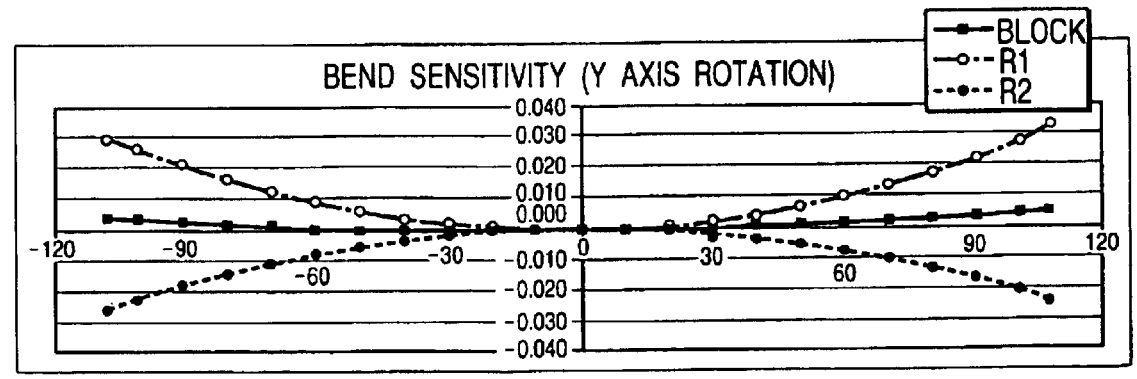
Figure 5D:
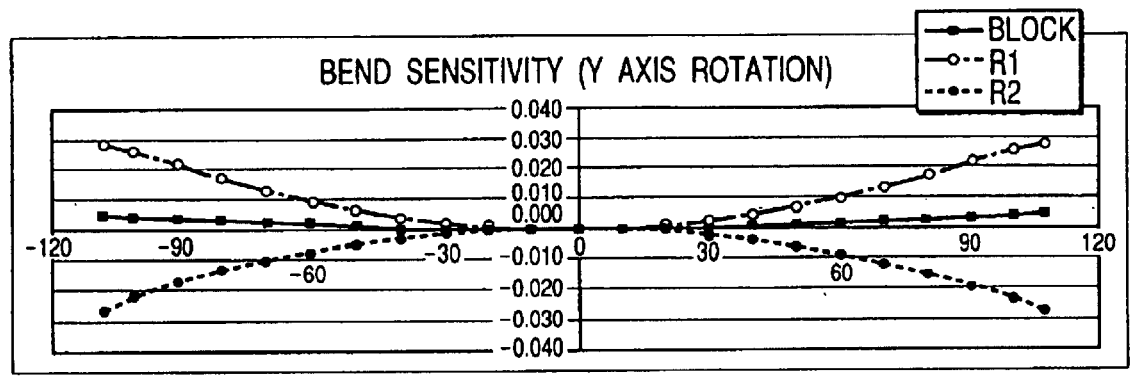
Figure 5E:
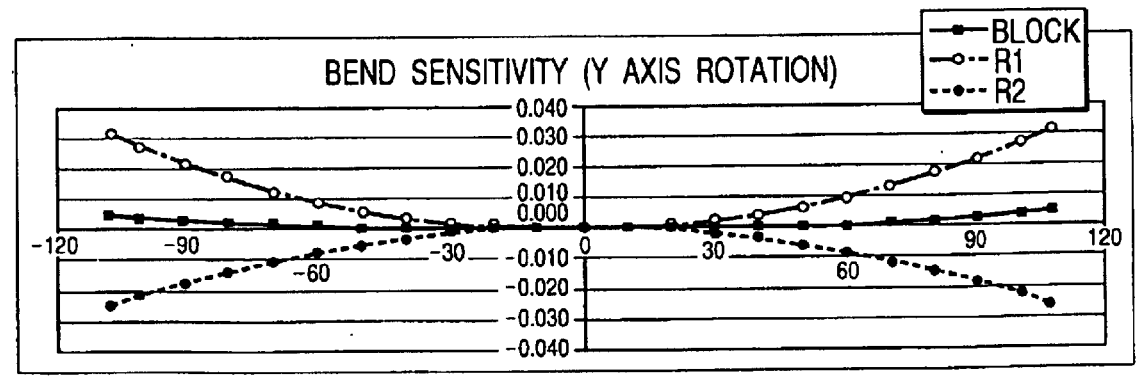
Figure 6A:
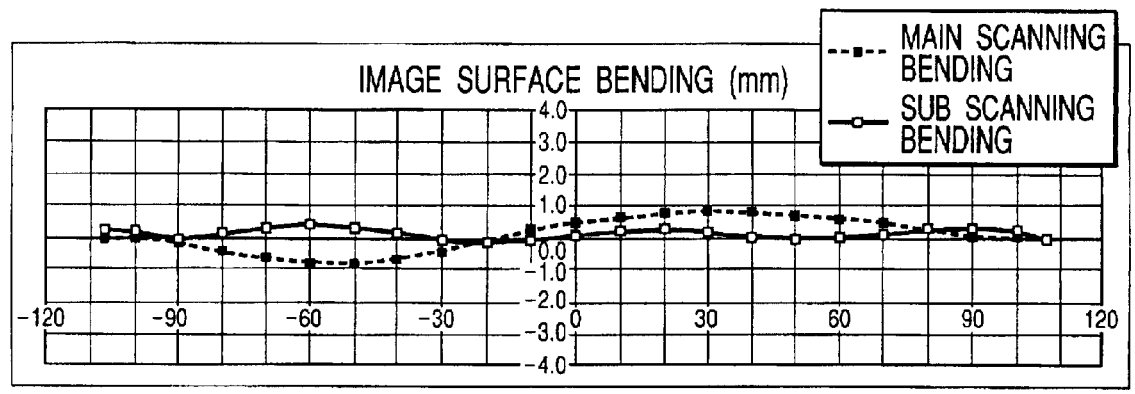
FIGS. 6A, 6B, 6C, 6D and 6E are graphs showing the image surface bending of the scanning lenses specified in Tables 1 to 5.
Figure 6B:
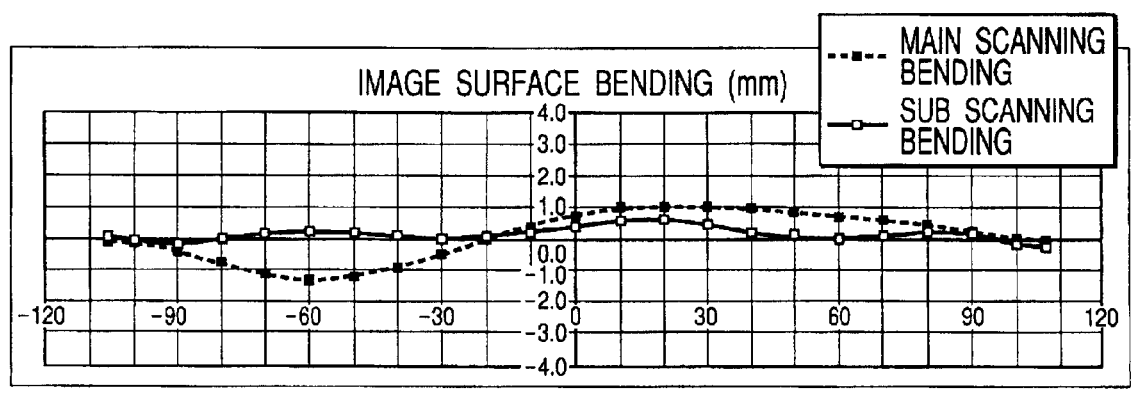
Figure 6C:
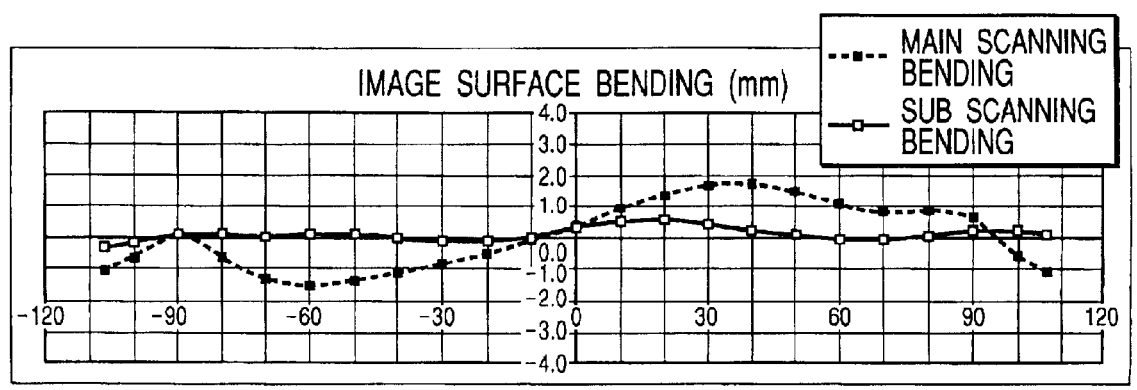
Figure 6D:
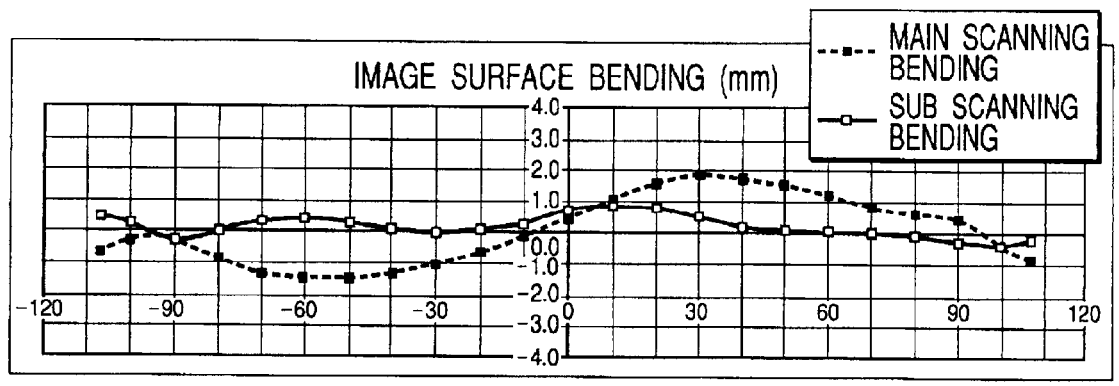
Figure 6E:
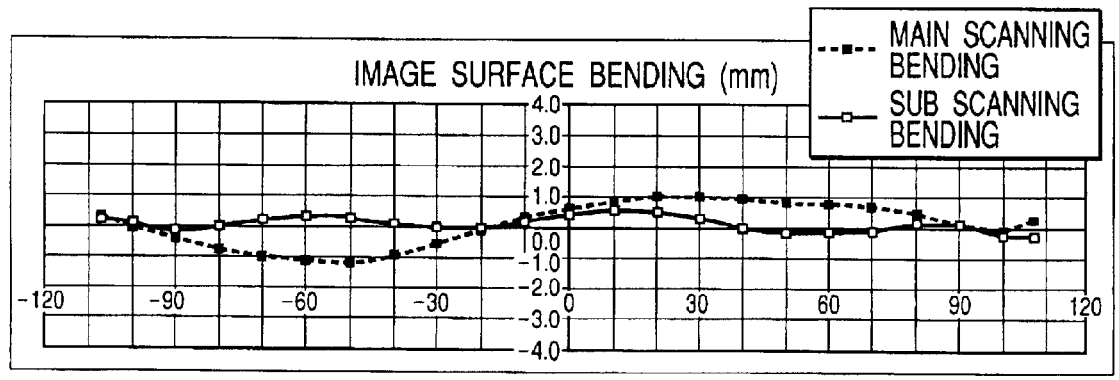
Figure 7A:
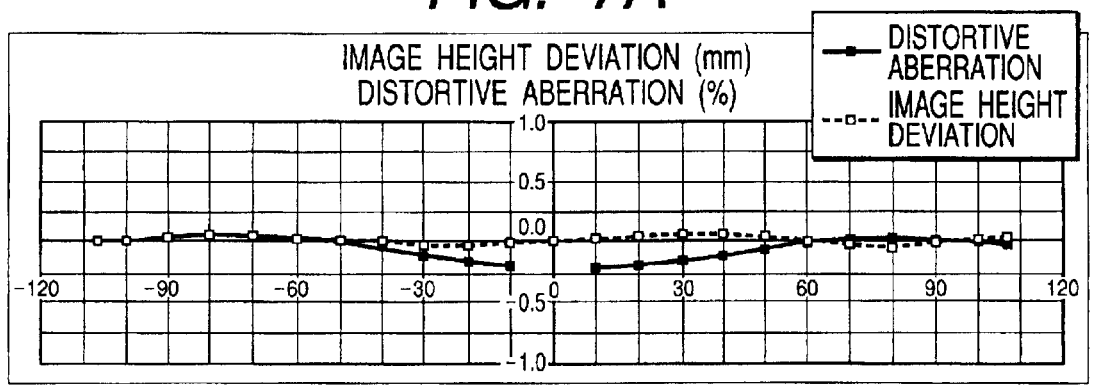
FIGS. 7A, 7B, 7C, 7D and 7E are graphs showing the f-θ characteristics of the scanning lenses specified in Tables 1 and 5.
Figure 7B:
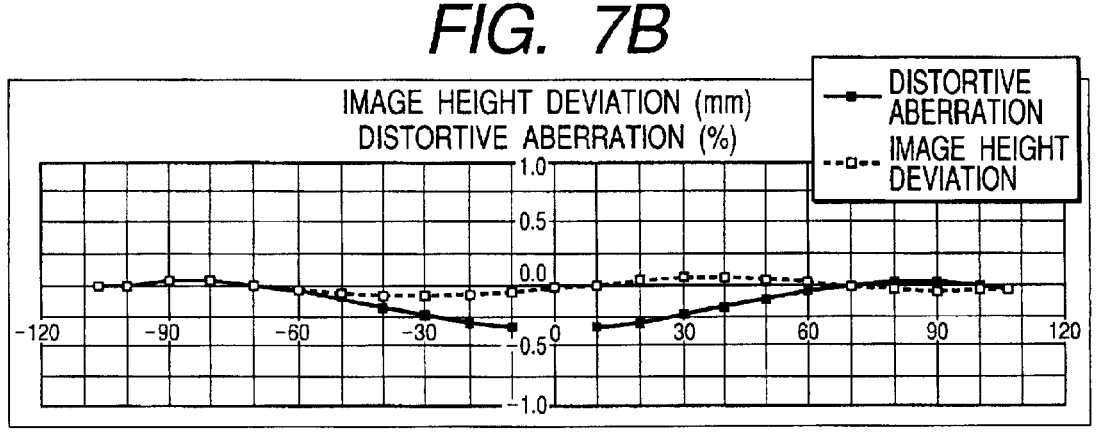
Figure 7C:
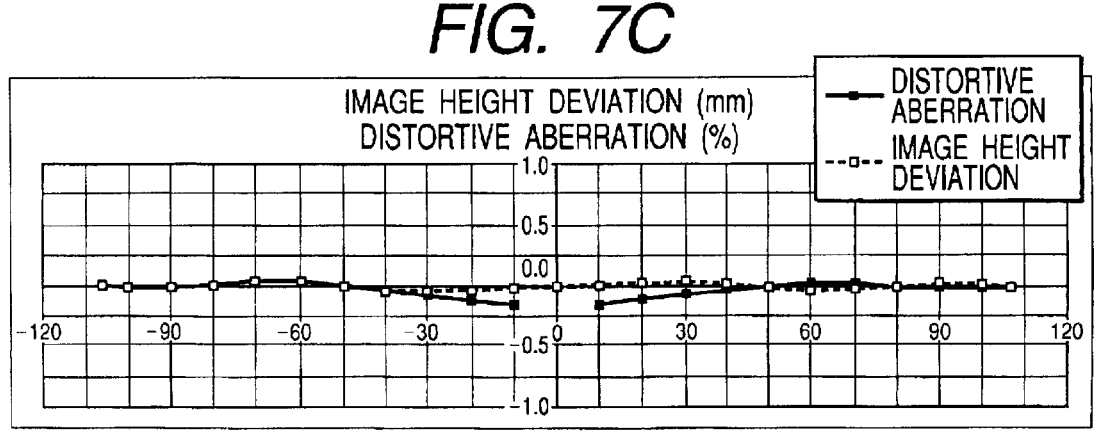
Figure 7D:
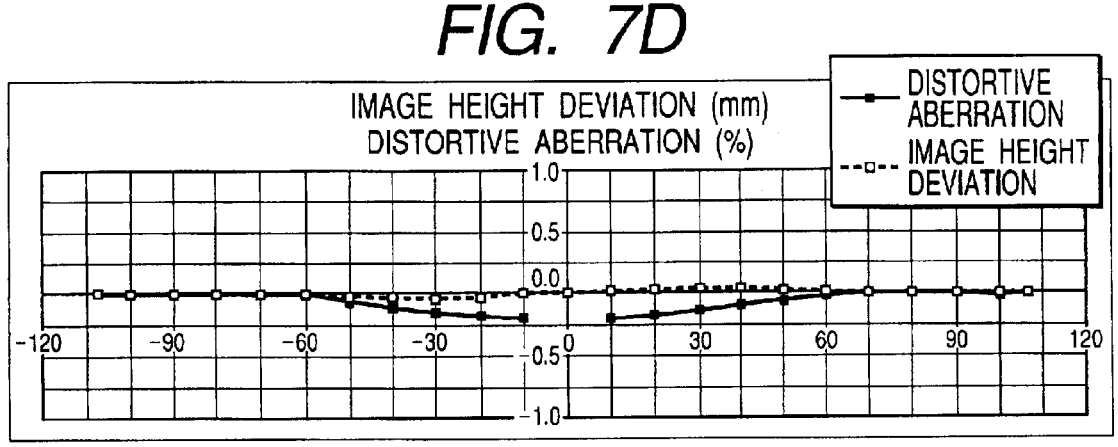
Figure 7E:
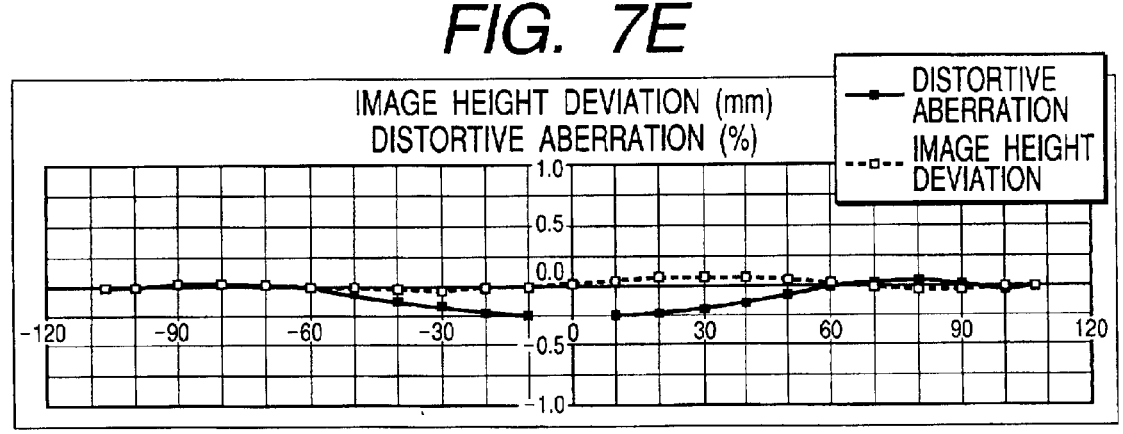
Figure 8A:
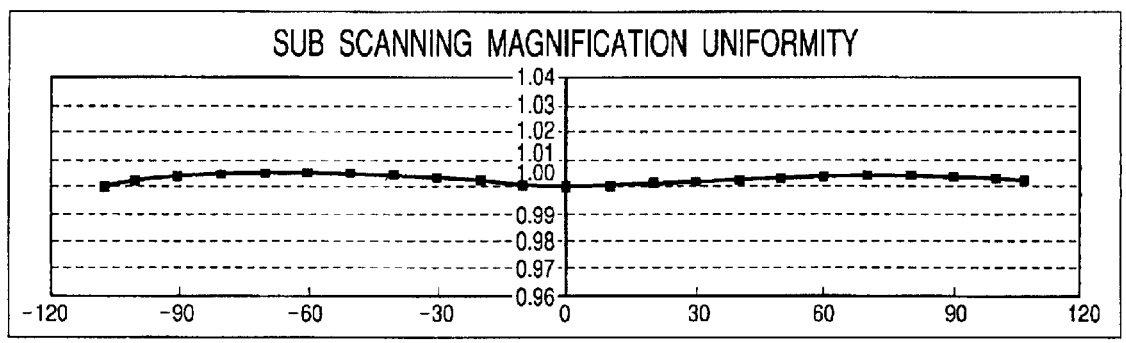
FIGS. 8A, 8B, 8C, 8D and 8E are graphs showing the sub scanning magnifications of the scanning lenses specified in Tables 1 to 5.
Figure 8B:
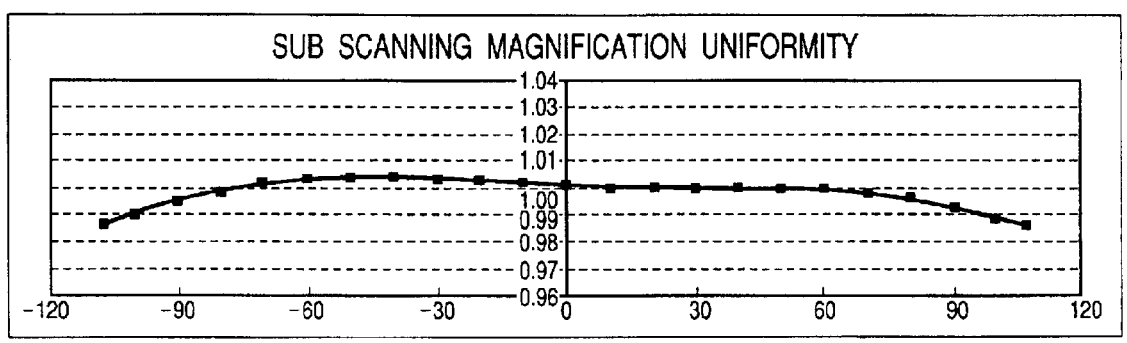
Figure 8C:
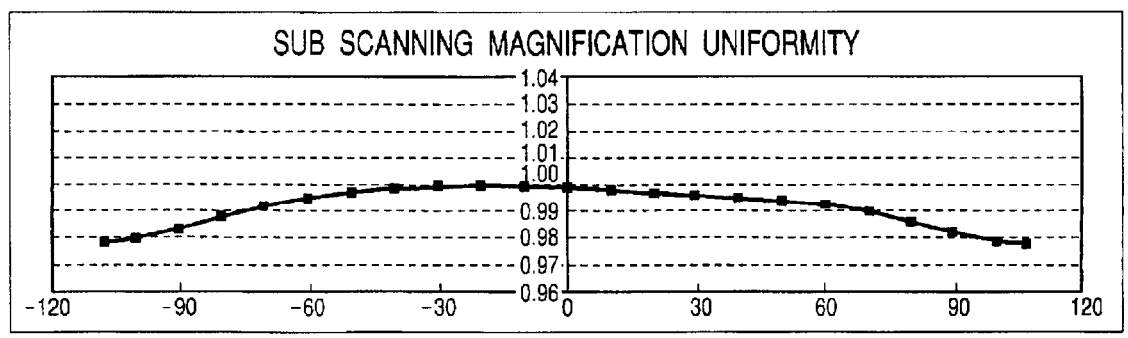
Figure 8D:
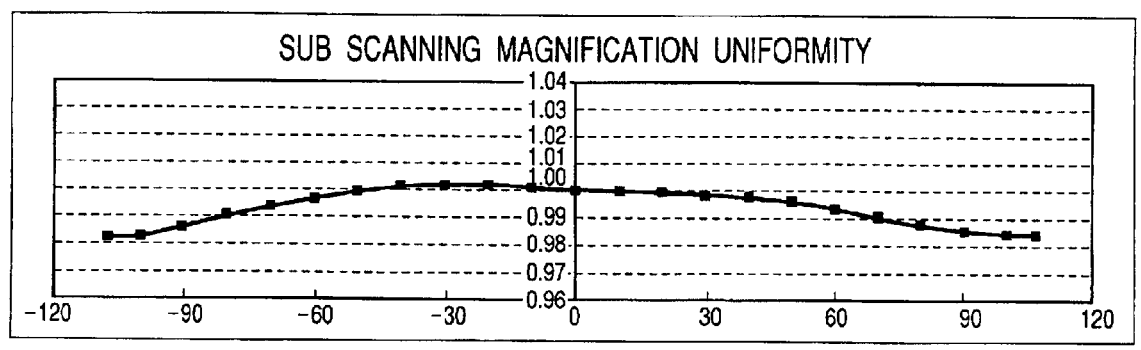
Figure 8E:
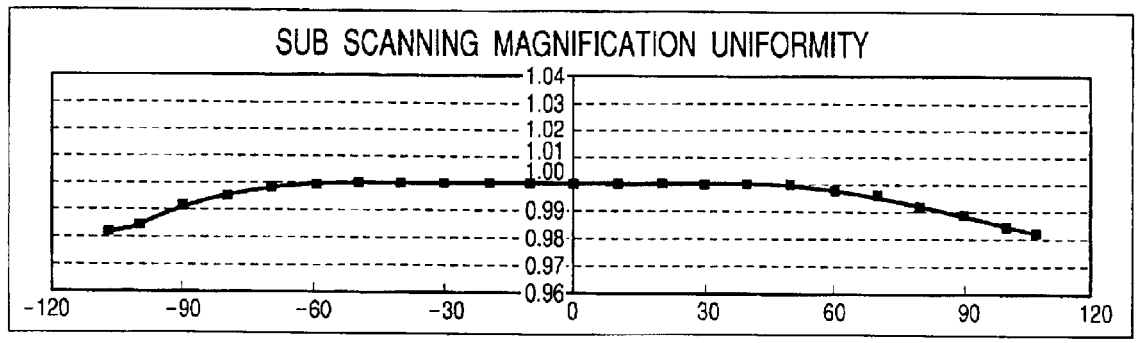

FIG. 3 shows the main scanning shape obtained by a logical expression and the actual shape shown in Table 1 with the shapes on only one side with respect to the optical axis being superimposed.

As is obvious from them, the actual shape satisfies expressions (1) and (2).

Although the sub scanning magnification preferably falls within an error of 5%, even if it has an error of about 10%, a deterioration in image quality does not reach a level at which it can be visually recognized on the image. For this reason, even if the aspherical surface shape has a slight error with respect to the main scanning shape obtained by the above logical calculation, a satisfactory effect can be obtained. For example, with a sub scanning magnification error of α%, the main scanning shape exhibits a shift of Δh with respect to the shape obtained from logical expressions (1) to (6) in the surface normal direction.

If $(1+\alpha/100)\cdot|\beta|=\{L_3(\theta)+\Delta h\}/[L_1(\theta)+\{L_2(\theta)-\Delta h\}/n]$, $\Delta h = L_3(\theta)\cdot\alpha/100\cdot\{1+(1+\alpha/100)\cdot|\beta|/n\}$, and α=10(%), then the above expression is written into $\Delta h=0.1\ L_3(\theta)/(1+1.1\cdot|\beta|/n)$ According to the numerical embodiment shown in Table 1, the lens is relatively as thin as 16 mm. In consideration of a manufacturing process such as plastic molding, however, the lens thickness is preferably reduced. In the numerical embodiments shown in Tables 2 and 3, the lens thickness is reduced while the main scanning sectional shape is so maintained as to keep the sub scanning magnification uniform. According to the numerical embodiments shown in Tables 4 and 5, power is set in the sub scanning direction on the incident surface side without changing the effect of keeping the sub scanning magnification uniform and decreasing the scanning line bend sensitivity level. In Table 4, negative power is set in the sub scanning direction on the incident surface side. In Table 5, positive power is set in the sub scanning direction on the incident surface side.

In these tables, the total power of the single lens 6 in the sub scanning direction is represented by φs, and the power of an exit surface 6b in the sub scanning direction is represented by φs2.

In the light scanning device based on the numerical embodiment specified in Table 1, the equivalent air distance (real distance/refraction factor inside the lens) from a deflecting surface 5a of the polygon mirror to the exit surface 6b of the single lens on the optical axis is given by $L_{ao}$=55.58 mm, the distance from the exit surface 6b of the single lens to a surface 8 to be scanned is given by $L_{bo}$=146.77 mm, the equivalent air distance from the deflecting surface 5a of the polygon mirror to the exit surface 6b of the single lens at an off-axis position is given by $L_{a\theta}$=62.68 mm, and the distance from the exit surface 6b of the single lens to the surface 8 to be scanned is given by $L_{b\theta}$=169.44 mm. The shapes of the two surfaces 6a and 6b (the exit surface 6b, in particular) in the main scanning direction (generatrix) are determined to satisfy the following conditions:

$$\frac{L_{b\theta}}{L_{a\theta}} = 0.987 \times \frac{L_{bo}}{L_{ao}} \tag{A}$$

$$0.9 \times \frac{L_{bo}}{L_{ao}} \leq \frac{L_{b\theta}}{L_{a\theta}} \leq 1.1 \times \frac{L_{bo}}{L_{ao}} \tag{B}$$

This makes it possible to concentrate the power of the single lens 6 in the sub scanning direction on the exit surface 6b.

In addition, with the single arrangement in which the sagittal radius of curvature is continuously changed with an increase in distance from the optical axis in the main scanning direction, image surface bending in the sub scanning direction, the sub scanning magnification, and the uniformity (sub scanning magnification uniformity) in the entire scanning area on the surface 8 to be scanned can be simultaneously and properly corrected.

Likewise, in the numerical embodiments specified in Tables 2 to 5, 0.971, 0.962, 0.961, and 0.974 are obtained in the order named. That is, inequality (B) is satisfied in all the numerical embodiments.

Figure 13:
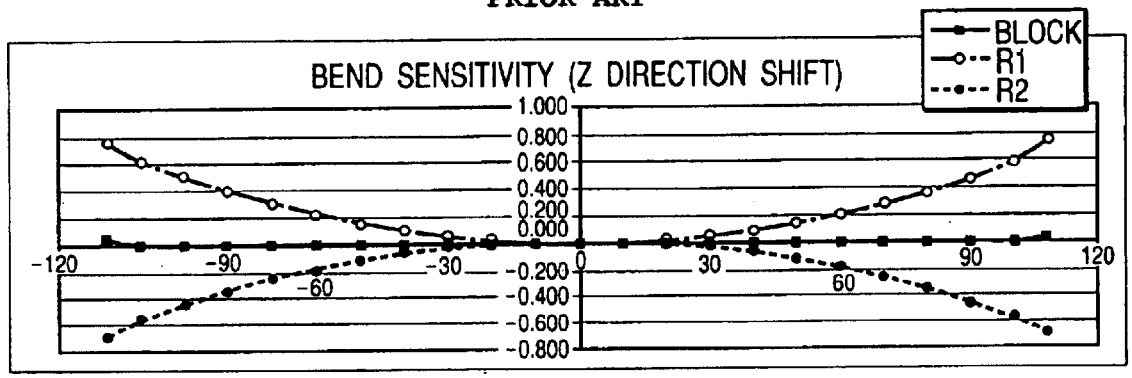
FIG. 13 is a graph showing the bend sensitivity level of the conventional scanning lens due to a Z-direction shift.

The effect of reducing scanning line bending due to surface decentering, which is a characteristic feature of this embodiment, will be described with reference to FIGS. 4A to 4E. In FIGS. 4A to 4E, Block, R1, R2 respectively refer to a lens, an incident surface and an exit surface. FIGS. 4A to 4E show scanning line bending in a case wherein each surface and the lens block shift by 50 μm in the Z direction. Obviously, the bend sensitivity level is decreased about two orders of magnitude in the prior art shown in FIG. 13. This makes it possible to prevent scanning line bending and draw a high-quality image even if the exit surface undergoes a Z direction shift with respect to the incident surface due to insufficient assembly precision in the mold. In addition, in this embodiment, scanning line bending due to a surface tilt with respect to the main scanning direction serving as a rotation axis can be reduced.

As is obvious from the results shown in FIGS. 4A to 4E, even if the overall scanning lens shifts in a direction (Z direction) perpendicular to the surface to be scanned due to an error in mounting the lens in an optical box (housing) and the manufacturing error of the lens itself, the scanning line on the surface to be scanned is uniformly shifted by making the sub scanning magnification of the scanning lens substantially uniform, thus eliminating the scanning line bending due to the shift.

As is also obvious from FIGS. 4A to 4E, even if the exit surface undergoes a Z direction shift with respect to the incident surface due to insufficient assembly precision of the molded lens in the mold, scanning line bending on the surface to be scanned due to the shift can be eliminated by making the sub scanning magnification on each surface of the scanning lens substantially uniform.

Figure 14:
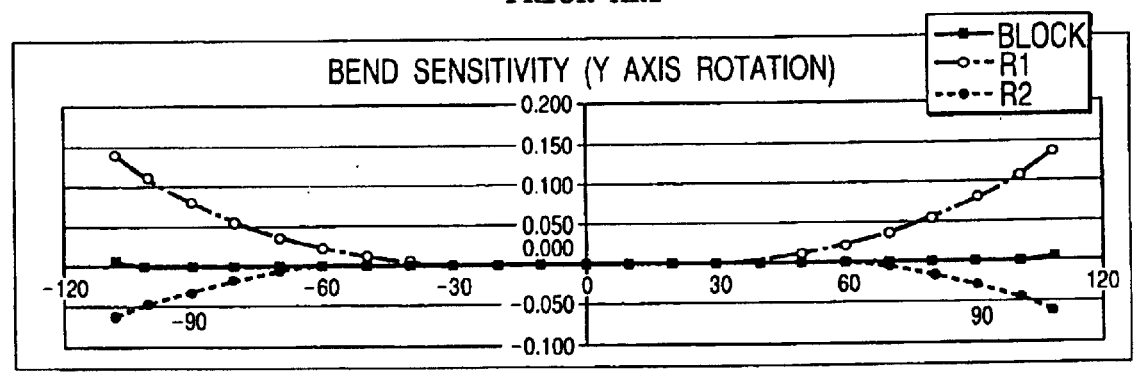
FIG. 14 is a graph showing the bend sensitivity level of the conventional scanning lens due to a rotation around an axis parallel to the main scanning direction.

FIGS. 5A to 5E are graphs in which the scanning line bending amounts are plotted in a case wherein each surface of the lens and the lens block are tilted by 3' with respect to a straight line as a rotation axis which passes through each surface vertex (the surface vertex of the lens block on the incident side) and is parallel to the main scanning direction. In FIGS. 5A to 5E, Block, R1, R2 respectively refer to a lens, an incident surface and an exit surface. Obviously, as compared with the prior art in FIG. 14, the sensitivity level of each surface is reduced about ⅕, and the bending amount obtained when the block is tilted is at a level at which no problem arises.

With the above effects, a low-cost, high-quality light scanning device can be provided, which can greatly reduce the precision required in molding a lens and mounting it in a housing.

FIGS. 6A to 6E are graphs showing image surface bending in the respective embodiments. FIGS. 7A to 7E are graphs showing the deviation of an imaging point on the surface to be scanned from the f-θ characteristics at each deflection angle. FIGS. 8A to 8E are graphs showing sub scanning magnification uniformity. Image surface bending in the main scanning direction occurs asymmetrically with respect to the optical axis. This image surface bending can be corrected by making the main scanning shape asymmetrical with respect to the optical axis, shifting it in the main scanning direction, or tilting the lens in the main scanning direction. The image surface bending amount itself does not reach a level at which a problem arises, and the effect of the present invention (reducing scanning line bending) is not impaired.

In addition, if the distance from a deflection point to the surface to be scanned is 1.2 to 1.45 times the focal length f of the scanning lens, both a decrease in scanning line bend sensitivity level and correction of image surface bending can be realized by the above method. Below the lower limit, since large image surface bending occurs, it is difficult to scan with a small spot at all image heights. Beyond the upper limit, the lens size itself increases, and the tact time in molding prolongs in the case with a plastic lens, resulting in difficulty in providing a low-cost scanning lens.

Although the effect of reducing scanning line bend sensitivity is higher when the power in the sub scanning direction is concentrated on the exit surface side, a similar effect can be satisfactorily obtained by making the incident surface side have power of about 10%, preferably 5%, of the power on the exit surface side.

When the present invention is applied to a multi-beam scanning device, a high-speed, low-cost light scanning device with reduced manufacturing sensitivity can be provided, in which the intervals between a plurality of beams are uniform at all image heights.

In addition, a diffraction grating surface may be formed on at least one of the surfaces of the scanning imaging lens 6 to compensate for focus movement at the time of an environment change which is especially noticeable in the case of a plastic lens.

The number of beams that are generated by the multi-beam laser may be two or three or more.

A single lens 6 serving as the scanning optical element in this embodiment may be a glass lens formed by a molding process.

The present invention, however, is not limited to a molded lens, and may be applied to a lens formed by polishing.

Second Embodiment

Figure 9:
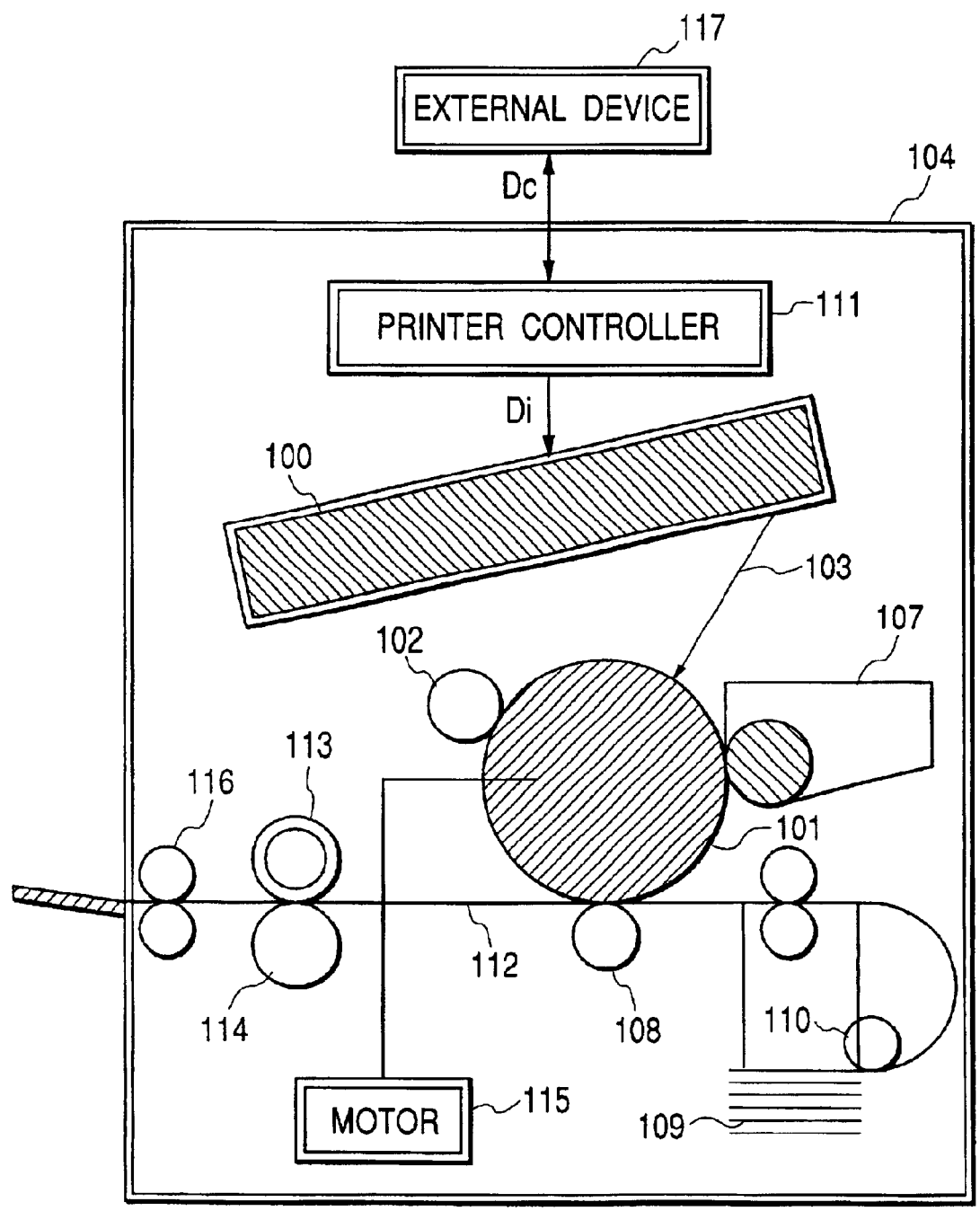
FIG. 9 is a view showing an image forming apparatus using a scanning imaging lens according to the present invention.

FIG. 9 is a sectional view showing the main part of an image forming apparatus according to an embodiment of the present invention in the sub scanning direction.

Referring to FIG. 9, an image forming apparatus 104 receives code data Dc from an external device 117 such as a personal computer. This code data Dc is converted into image data (dot data) Di by the printer controller 111 in the apparatus. The image data Di is input to a light scanning unit 100 having the arrangement exemplified by each of the first, second, and third embodiments. A light beam 103 modulated in accordance with the image data Di emerges from the light scanning unit 100. The photosensitive surface of a photosensitive drum 101 is scanned with this light beam 103 in the main scanning direction.

The photosensitive drum 101 serving as an electrostatic latent image bearing member is rotated clockwise by a motor 115. With this rotation, the photosensitive surface of the photosensitive drum 101 moves in the sub-scanning direction perpendicular to the main scanning direction. A charge roller 102 is placed above the surface of the photosensitive drum 101 to be in contact with its surface so as to uniformly charge it. The surface of the photosensitive drum 101 charged by the charge roller 102 is irradiated with the light beam 103 scanned by the light scanning unit 100.

As described, the light beam 103 is modulated on the basis of the image data Di. By irradiating the surface of the photosensitive drum 101 with this light beam 103, an electrostatic latent image is formed on the surface. This electrostatic latent image is developed into a toner image by a developing device 107 placed downstream from the irradiation position of the light beam 103 within a rotating section of the photosensitive drum 101 so as to be in contact with the photosensitive drum 101.

The toner image developed by the developing device 107 is transferred onto a paper sheet 112 serving as a transfer member by a transferring roller 108. The paper sheet 112 is stored in a paper cassette 109 in front of the photosensitive drum 101 (on the right side in FIG. 9). However, a paper sheet can also be fed manually. A pickup roller 110 is placed at an end portion of the paper cassette 109 to feed the paper sheet 112 from the paper cassette 109 into a convey path.

In the above manner, the paper sheet 112 on which the unfixed toner image is transferred is conveyed to a fixing device behind the photosensitive drum 101 (on the left side in FIG. 9). The fixing device is constituted by a fixing roller 113 incorporating a fixing heater (not shown) and a press roller 114 placed in contact with the fixing roller 113. The fixing device fixes the unfixed toner image on the paper sheet 112 by heating the paper sheet 112 conveyed from the transferring unit while pressing it between the fixing roller 113 and the press portion of the press roller 114. Furthermore, the image-fixed paper sheet 112 is discharged from the image forming apparatus by using a sheet discharging roller 116 placed behind the fixing roller 113.

Although not shown in FIG. 9, the printer controller 111 controls the respective units in the image forming apparatus including the motor 115 and the polygon motor in the light scanning unit 100 as well as the data conversion described above.

In this case, when, for example, a multi-beam laser is used as a light source for the light scanning device, it is required to keep the sub scanning pitch interval between two beams constant. For this purpose, it is indispensable to keep the sub scanning magnification constant in the entire scanning area. In the prior art, this requirement is met by controlling the position of the main flat surface with the bending of two surfaces. For this reason, scanning line bending is caused by lens decentering due to a mold assembling error and a mounting error of a housing, posing a problem in terms of image quality. The present invention, however, has succeeded in solving this problem by an approach based on optical design.

Third Embodiment

Figure 10:
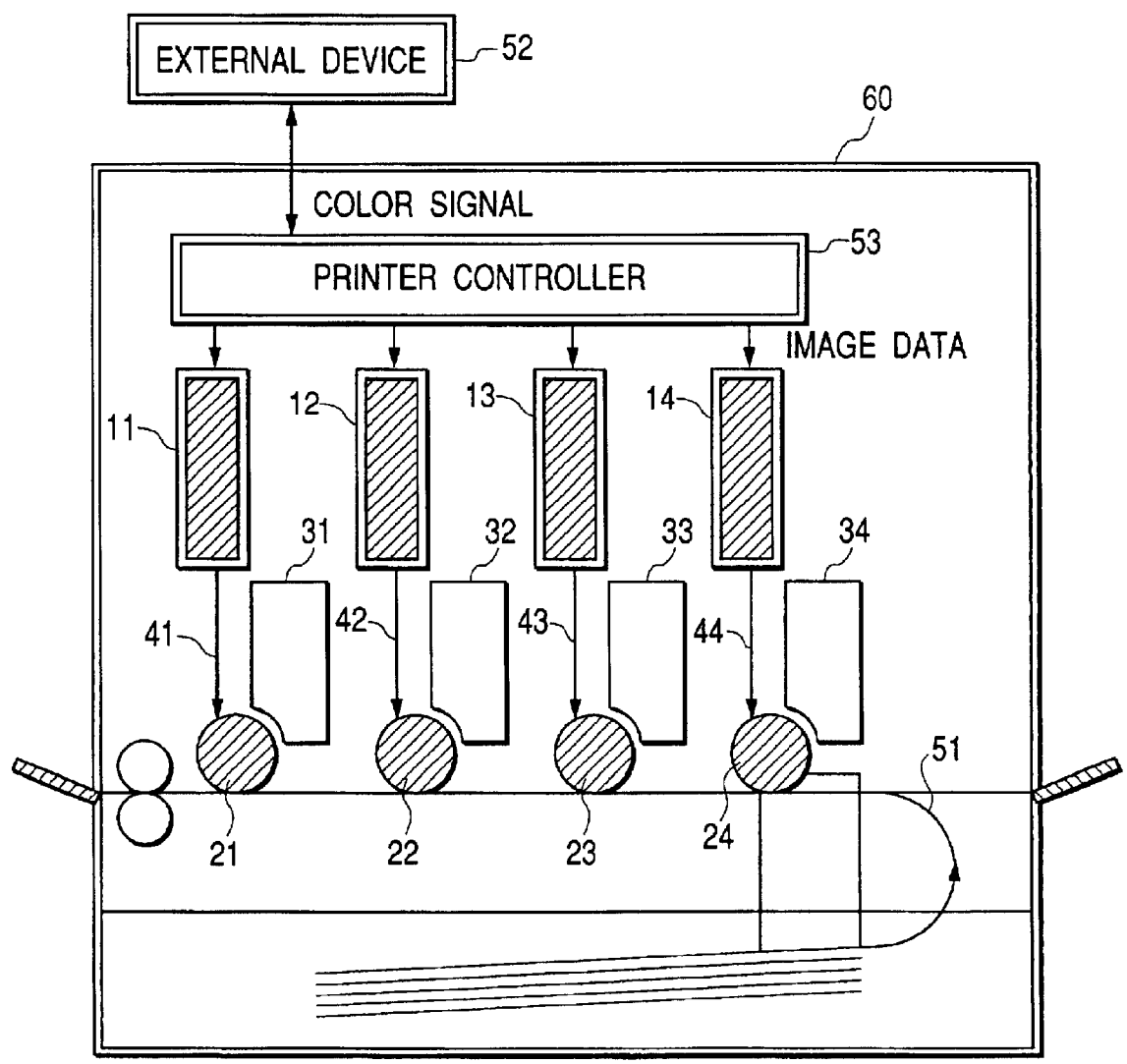
FIG. 10 is a view showing a color image forming apparatus using the scanning imaging lens according to the present invention.
Figure 11:
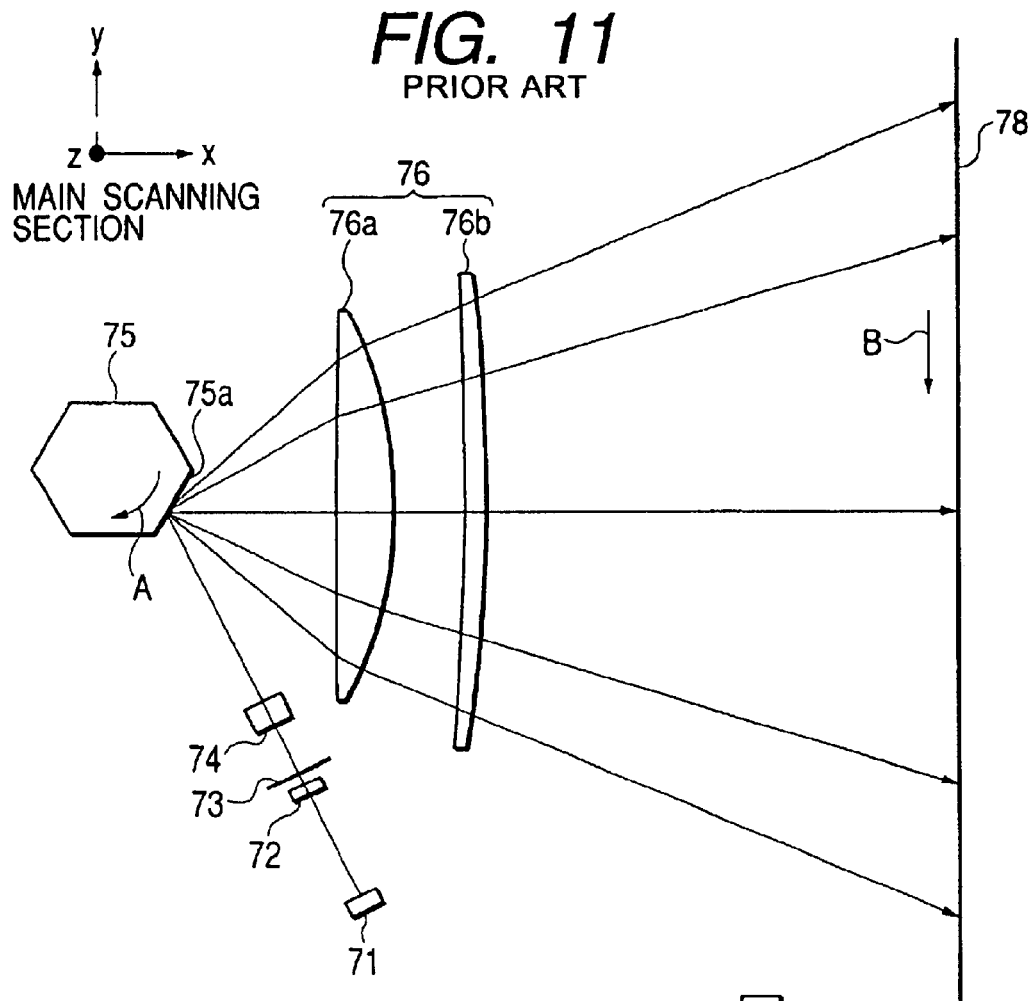
FIG. 11 is a sectional view showing a conventional light scanning device.
Figure 12:
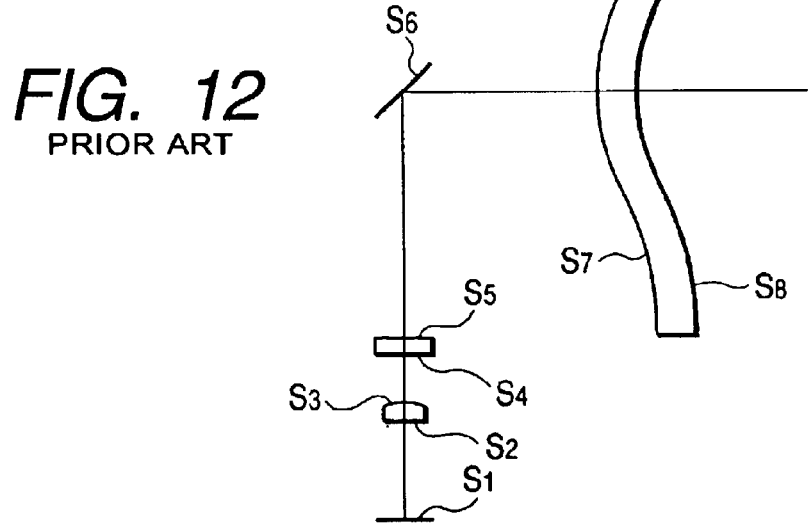
FIG. 12 is a sectional view showing a conventional single-lens system.

FIG. 10 is a schematic view showing the main part of a color image forming apparatus according to an embodiment of the present invention. This embodiment relates to a color image forming apparatus of the tandem type which has four light scanning devices juxtaposed to each other and concurrently records image information on a photosensitive drum surface which is an image bearing member.

Referring to FIG. 10, a color image forming apparatus 60 includes light scanning devices 11, 12, 13, and 14 each having one of the scanning imaging lenses specified in Tables 1 to 5, photosensitive drums 21, 22, 23, and 24 serving as image bearing members, developing devices 31, 32, 33, and 34, and a convey belt 51.

Referring to FIG. 10, the color image forming apparatus 60 receives color signals, i.e., R (red), G (green), and B (blue) signals, from an external device 52. These color signals are converted into C (cyan), M (magenta), Y (yellow), and B (black) image data (dot data) by a printer controller 53 in the apparatus. These image data are respectively input to the light scanning devices 11, 12, 13, and 14. These light scanning devices then emit light beams 41, 42, 43, and 44 modulated in accordance with the respective image data. The photosensitive surfaces of the photosensitive drums 21, 22, 23, and 24 are scanned with these light beams in the main scanning direction.

In the color image forming apparatus of this embodiment, four light scanning devices (11, 12, 13, and 14) are arranged in correspondence with C (cyan), M (magenta), Y (yellow), and B (black), which concurrently record image signals (image information) on the respective photosensitive drums 21, 22, 23, and 24, thereby printing a color image at high speed.

In the color image forming apparatus according to this embodiment, as described above, the four light scanning devices 11, 12, 13, and 14 respectively form latent images of the respective colors on the photosensitive drums 21, 22, 23, and 24 by using light beams based on the respective image data. Thereafter, these images are superimposed and transferred onto a recording medium to form one full-color image.

As the external device 52, for example, a color image reader having a CCD sensor may be used. In this case, a color digital copying machine is constituted by this color image reader and the color image forming apparatus 60.

The present invention can also be applied to a form in which two imaging optical systems correspond to one deflecting means, and two units having photosensitive devices corresponding to each imaging optical system are arranged. In addition, the present invention can be applied to a form in which two imaging optical systems correspond to one deflecting means, and two photosensitive devices correspond to each imaging optical system.

In this case, especially scanning line bending in the color image forming apparatus must be reduced. This is because, if different scanning line bends are caused for the respective colors, color misregistration occurs regardless whether registration in the sub scanning direction is made. Since color misregistration is much more noticeable than linearity in terms of a color appearance model, a reduction in scanning line bending in a color image forming apparatus is required much more strictly than a single-color image forming apparatus. In the prior art, such a requirement is met by improving the mold assembly precision and mounting precision of a housing. The present invention, however, has succeeded in solving this problem by an approach based on optical design.

TABLE 1

Design Data

| Wave Length, Refraction Factor | | | Surface Shape of Toric Lens (Main-Scanning) | | | Surface Shape of Toric Lens (Sub Scanning) | |
|---|---|---|---|---|---|---|---|
| Used Wavelength | λ (nm) | 780 | First Surface | Second Surface | | First Surface | Second Surface |
| Refraction Factor of Toric Lens | nd | 1.53064 | R | 2.95190E+02 | −1.05129E+02 | r | ∞ | −2.09325E+01 |
| Abbe Number of Toric Lens | vd | 55.5 | K | −5.50208E+01 | 2.17685E+00 | D2s | | 1.10515E−04 |
| Light Ray Angle | | | B4 | −3.68191E−07 | | D4s | | −1.75506E−08 |
| Polygon Incidence Angle | θp | −90.0 | B6 | 5.73568E−11 | | D6s | | −5.05022E−12 |
| Polygon Maximum Exit Angle | θe | 40.9 | B8 | −1.96977E−14 | | D8s | | 1.06976E−14 |
| Arrangement | | | B10 | 1.83395E−18 | | D10s | | −2.94675E−18 |
| Polygon Surface - Toric Lens First Surface | e1 | 43.09 | | suffix s: laser side suffix e: anti-laser side | | D2e | | 9.32013E−05 |
| Central Thickness of Toric Lens | d1 | 16.00 | | | | D4e | | 3.32596E−09 |
| Toric Lens Second Surface - Surface to Be Scanned | e2 | 146.77 | | | | D6e | | −1.10332E−12 |
| Effective Scanning Width on Surface to Be Scanned | W | 214.00 | | | | D8e | | −2.98687E−15 |
| Others | | | | | | D10e | | 1.53677E−18 |
| Main scanning Focal Length of Toric Lens | fm | 149.95 | | | | | | |
| Polygon Surface - Surface to Be Scanned | L | 205.86 | | | | | | |
| L/fm | a | 1.37 | | | | | | |
| Main Surface Interval | HH′ | 10.64 | | | | Power Ratio of Sub Scanning | | |
| (L − HH′)/fm | b | 1.30 | | | | φs2/φs | | 1.000 |

TABLE 2

Design Data

| Wave Length, Refraction Factor | | | Surface Shape of Toric Lens (Main-Scanning) | | | Surface Shape of Toric Lens (Sub Scanning) | |
|---|---|---|---|---|---|---|---|
| Used Wavelength | λ (nm) | 780 | | First Surface | Second Surface | | First Surface | Second Surface |
| Refraction Factor of Toric Lens | nd | 1.53064 | R | 2.49293E+02 | −1.12579E+02 | r | ∞ | −1.95366E+01 |
| Abbe Number of Toric Lens | vd | 55.5 | K | −5.37846E+01 | 3.52922E+00 | D2s | | 1.48061E−04 |
| Light Ray Angle | | | B4 | −4.06259E−07 | | D4s | | −3.84716E−08 |
| Polygon Incidence Angle | θp | −90.0 | B6 | 3.19276E−11 | | D6s | | 3.79914E−12 |
| Polygon Maximum Exit Angle | θe | 40.9 | B8 | −1.52669E−14 | | D8s | | 1.07871E−14 |

TABLE 2-continued

Design Data

| Wave Length, Refraction Factor | | | Surface Shape of Toric Lens (Main-Scanning) | | | Surface Shape of Toric Lens (Sub Scanning) | |
|---|---|---|---|---|---|---|---|
| Used Wavelength | λ (nm) | 780 | First Surface | Second Surface | | First Surface | Second Surface |
| Arrangement Polygon Surface - Toric Lens First Surface | e1 | 39.50 | B10 | 1.28004E−18 suffix s: laser side suffix e: anti-laser side | | D10s D2e | −4.02753E−18 1.19774E−04 |
| Central Thickness of Toric Lens | d1 | 14.00 | | | | D4e | 1.29523E−08 |
| Toric Lens Second Surface - Surface to Be Scanned | e2 | 146.37 | | | | D6e | −1.52786E−11 |
| Effective Scanning Width on Surface to Be Scanned | W | 214.00 | | | | D8e | −2.98687E−15 |
| Others Main scanning Focal Length of Toric Lens | fm | 149.95 | | | | D10e | 4.00148E−18 |
| Polygon Surface - Surface to Be Scanned | L | 199.87 | | | | | |
| L/fm | a | 1.33 | | | | | |
| Main Surface Interval | HH' | 9.31 | | | | Power Ratio of Sub Scanning | |
| (L − HH')/fm | b | 1.27 | | | | φs2/φs | 1.000 |

TABLE 3

Design Data

| Wave Length, Refraction Factor | | | Surface Shape of Toric Lens (Main-Scanning) | | | Surface Shape of Toric Lens (Sub Scanning) | |
|---|---|---|---|---|---|---|---|
| Used Wavelength | λ (nm) | 780 | First Surface | Second Surface | | First Surface | Second Surface |
| Refraction Factor of Toric Lens | nd | 1.53064 | R | 1.82561E+02 | −1.34614E+02 | r ∞ | −1.84697E+01 |
| Abbe Number of Toric Lens | νd | 55.5 | K | −3.18446E+01 | 5.88466E+00 | D2s | 2.09599E−04 |
| Light Ray Angle | | | B4 | −1.12396E−06 | −4.43266E−07 | D4s | −1.42552E−07 |
| Polygon Incidence Angle | θp | −90.0 | B6 | 2.26395E−10 | −2.46108E−10 | D6s | 1.46396E−10 |
| Polygon Maximum Exit Angle | θe | 40.9 | B8 | −1.18760E−14 | 1.83604E−13 | D8s | −9.97129E−14 |
| Arrangement Polygon Surface - Toric Lens First Surface | e1 | 36.62 | B10 | −2.07529E−17 suffix s: laser side suffix e: anti-laser side | −6.11698E−17 | D10s D2e | 2.92123E−17 1.65657E−04 |
| Central Thickness of Toric Lens | d1 | 13.00 | | | | D4e | −7.01657E−09 |
| Toric Lens Second Surface - Surface to Be Scanned | e2 | 145.96 | | | | D6e | −4.40732E−11 |
| Effective Scanning Width on Surface to Be Scanned | W | 214.00 | | | | D8e | 3.50629E−14 |
| Others | | | | | | D10e | −7.91632E−18 |

TABLE 3-continued

Design Data

| Wave Length, Refraction Factor | | | Surface Shape of Toric Lens (Main-Scanning) | | Surface Shape of Toric Lens (Sub Scanning) | |
|---|---|---|---|---|---|---|
| Used Wavelength | λ (nm) | 780 | First Surface | Second Surface | First Surface | Second Surface |
| Main scanning Focal Length of Toric Lens | fm | 149.92 | | | | |
| Polygon Surface - Surface to Be Scanned | L | 195.58 | | | | |
| L/fm | a | 1.30 | | | | |
| Main Surface Interval | HH' | 8.65 | | | Power Ratio of Sub Scanning | |
| (L − HH')/fm | b | 1.25 | | | φs2/φs | 1.000 |

TABLE 4

Design Data

| Wave Length, Refraction Factor | | | Surface Shape of Toric Lens (Main-Scanning) | | | Surface Shape of Toric Lens (Sub Scanning) | |
|---|---|---|---|---|---|---|---|
| Used Wavelength | λ (nm) | 780 | | First Surface | Second Surface | First Surface | Second Surface |
| Refraction Factor of Toric Lens | nd | 1.53064 | R | 1.66422E+02 | −1.45261E+02 | r  −3.24535E+02 | −1.72326E+01 |
| Abbe Number of Toric Lens | vd | 55.5 | K | −4.36569E+01 | 1.02053E+01 | D2s | 2.06887E−04 |
| Light Ray Angle | | | B4 | −1.43326E−06 | −8.85942E−07 | D4s | −1.16122E−07 |
| Polygon Incidence Angle | θp | −90.0 | B6 | 1.00901E−09 | 3.18470E−10 | D6s | 1.19760E−11 |
| Polygon Maximum Exit Angle | θe | 40.9 | B8 | −7.89881E−13 | 1.61838E−14 | D8s | 4.32170E−14 |
| Arrangement | | | B10 | 1.30105E−16 | −1.45243E−16 | D10s | −1.76447E−17 |
| Polygon Surface - Toric Lens First Surface | e1 | 35.28 | | suffix s: laser side suffix e: anti-laser side | | D2e | 1.61270E−04 |
| Central Thickness of Toric Lens | d1 | 12.00 | | | | D4e | 6.29320E−09 |
| Toric Lens Second Surface - Surface to Be Scanned | e2 | 145.84 | | | | D6e | −9.63198E−11 |
| Effective Scanning Width on Surface to Be Scanned | W | 214.00 | | | | D8e | 6.32998E−14 |
| Others | | | | | | D10e | −8.02029E−18 |
| Main scanning Focal Length of Toric Lens | fm | 149.95 | | | | | |
| Polygon Surface - Surface to Be Scanned | L | 193.13 | | | | | |
| L/fm | a | 1.29 | | | | | |
| Main Surface Interval | HH' | 7.98 | | | | Power Ratio of Sub Scanning | |
| (L − HH')/fm | b | 1.23 | | | | φs2/φs | 1.042 |

TABLE 5

Design Data

| Wave Length, Refraction Factor | | | Surface Shape of Toric Lens (Main-Scanning) | | | Surface Shape of Toric Lens (Sub Scanning) | |
|---|---|---|---|---|---|---|---|
| Used Wavelength | $\lambda$ (nm) | 780 | | First Surface | Second Surface | | First Surface | Second Surface |
| Refraction Factor of Toric Lens | nd | 1.53064 | R | 2.42364E+02 | −1.14019E+02 | r | 2.19972E+02 | −2.07641E+01 |
| Abbe Number of Toric Lens | $\nu$d | 55.5 | K | −4.82223E+01 | 4.38342E+00 | D2s | | 1.82916E−04 |
| Light Ray Angle | | | B4 | −5.14599E−07 | | D4s | | −2.34850E−08 |
| Polygon Incidence Angle | $\theta$p | −90.0 | B6 | 2.81558E−11 | | D6s | | −1.50404E−11 |
| Polygon Maximum Exit Angle | $\theta$e | 40.9 | B8 | −1.53776E−14 | | D8s | | 2.47392E−14 |
| Arrangement | | | B10 | −8.81445E−18 | | D10s | | −7.50000E−18 |
| Polygon Surface - Toric Lens First Surface | e1 | 39.42 | | suffix s: laser side suffix e: anti-laser side | | D2e | | 1.51171E−04 |
| Central Thickness of Toric Lens | d1 | 14.00 | | | | D4e | | 2.80324E−08 |
| Toric Lens Second Surface - Surface to Be Scanned | e2 | 146.41 | | | | D6e | | −2.07820E−11 |
| Effective Scanning Width on Surface to Be Scanned | W | 214.00 | | | | D8e | | −4.61796E−15 |
| Others | | | | | | D10e | | 5.69401E−18 |
| Main scanning Focal Length of Toric Lens | fm | 149.95 | | | | | | |
| Polygon Surface - Surface to Be Scanned | L | 199.82 | | | | | | |
| L/fm | a | 1.33 | | | | | | |
| Main Surface Interval | HH' | 9.31 | | | | Power Ratio of Sub Scanning | | |
| (L − HH')/fm | b | 1.27 | | | | $\phi$s2/$\phi$s | | 0.932 |

TABLE 6

Conditions f    150
n    1.5242
$\beta$    2.739
$L_1$ (0)    43.1
$L_2$ (0)    16.0

| | | Calculated from Logical Expression | | | | | Traced in Real Shape | | Logic/Real Shape (%) | |
|---|---|---|---|---|---|---|---|---|---|---|
| $\theta$ | $\theta'$ | $L_1(\theta)$ | $L_2(\theta)$ | $L_3(\theta)$ | $m(\theta)$ | $L_{23}(\theta)$ | $L_3(\theta)$ | $L_1+L_2$ | $L_3(\theta)$ | $L_1+L_2$ |
| 40.9 | 23.2 | 57.0 | 7.5 | 169.6 | 0.042 | 177.3 | 64.5 | 169.4 | 64.6 | 0.1 | −0.2 |
| 38.2 | 22.1 | 54.8 | 9.1 | 166.6 | 0.052 | 175.7 | 63.9 | 168.5 | 64.1 | 0.0 | −0.2 |
| 34.4 | 20.4 | 52.2 | 11.0 | 162.7 | 0.063 | 173.7 | 63.2 | 162.8 | 63.2 | 0.0 | −0.1 |
| 30.6 | 18.5 | 50.0 | 12.4 | 159.3 | 0.072 | 171.7 | 62.4 | 159.4 | 62.4 | −0.1 | 0.0 |
| 26.7 | 16.5 | 48.2 | 13.5 | 156.3 | 0.079 | 169.8 | 61.7 | 156.5 | 61.7 | −0.1 | 0.0 |
| 22.9 | 14.4 | 46.8 | 14.3 | 153.8 | 0.085 | 168.0 | 61.1 | 153.9 | 61.0 | −0.1 | 0.1 |
| 19.1 | 12.2 | 45.6 | 14.9 | 151.6 | 0.089 | 166.5 | 60.5 | 151.7 | 60.4 | −0.1 | 0.1 |
| 15.3 | 9.8 | 44.7 | 15.3 | 149.9 | 0.093 | 165.2 | 60.0 | 150.0 | 60.0 | −0.1 | 0.0 |
| 11.5 | 7.4 | 44.0 | 15.6 | 148.5 | 0.095 | 164.2 | 59.6 | 148.6 | 59.6 | 0.0 | 0.0 |

TABLE 6-continued

Conditions

| | |
|---|---|
| f | 150 |
| n | 1.5242 |
| β | 2.739 |
| $L_1(0)$ | 43.1 |
| $L_2(0)$ | 16.0 |

| Calculated from Logical Expression | | | | | | | | Traced in Real Shape | | Logic/Real Shape (%) | |
|---|---|---|---|---|---|---|---|---|---|---|---|
| θ | θ' | $L_1(\theta)$ | $L_2(\theta)$ | $L_3(\theta)$ | $m(\theta)$ | $L_{23}(\theta)$ | $L_1+L_2$ | $L_3(\theta)$ | $L_1+L_2$ | $L_3(\theta)$ | $L_1+L_2$ |
| 7.6 | 5.0 | 43.5 | 15.8 | 147.5 | 0.097 | 163.4 | 59.3 | 147.6 | 59.3 | 0.0 | 0.0 |
| 3.8 | 2.5 | 43.2 | 16.0 | 147.0 | 0.098 | 162.9 | 59.1 | 147.0 | 59.2 | 0.0 | 0.0 |
| 0 | 0.0 | 43.1 | 16.0 | 146.8 | 0.098 | 162.8 | 59.1 | 146.8 | 59.1 | 0.0 | 0.0 |

As has been described above, according to the present invention, there is provided a high-quality, low-cost light scanning device in which an f-θ lens formed from a single lens having power in the sub scanning direction concentrated on the exit surface side is used, and the shape of the exit surface in the main scanning direction is so determined as to make the sub scanning magnification uniform, thereby reducing the required assembly precision in the mold and the required precision in mounting the lens in a housing, suppressing the occurrence of scanning line bending, and reducing color misregistration due to scanning line bending in a color image forming apparatus, in particular.

What is claimed is:

1. A light scanning device having an imaging optical system for guiding a light beam emitted from light source means to a deflecting element, and forming the light beam deflected by the deflecting element into an image on a surface to be scanned, wherein said imaging optical system is formed from a single lens, sectional shapes of an incident surface and an exit surface of said single lens in a main scanning direction are non-arc shapes, power of the exit surface in a sub scanning direction satisfies $0.9 \leq \phi s2/\phi s \leq 1.1$ where $\phi s$ is power of the overall imaging optical system in the sub scanning direction and $\phi s2$ is power of the exit surface in the sub scanning direction, and the non-arc shape of the exit surface in the main scanning direction satisfies $$0.9 \times \frac{L_{bo}}{L_{ao}} \leq \frac{L_{b\theta}}{L_{a\theta}} \leq 1.1 \times \frac{L_{bo}}{L_{ao}}$$

where $L_{ao}$ is an equivalent air distance from the deflecting means on an optical axis to the exit surface of said single lens, $L_{bo}$ is a distance from the exit surface of said single lens to the surface to be scanned, $L_{a\theta}$ is an equivalent air distance from the deflecting means at an off-axis position to the exit surface of said single lens, and $L_{b\theta}$ is a distance from the exit surface of said single lens to the surface to be scanned.

2. A light scanning device according to claim 1, wherein the power of the exit surface in the sub scanning direction or/and the power of the incident surface in the sub scanning direction changes without correlation to a shape in the main scanning direction.

3. A light scanning device according to claim 1, wherein a radius of curvature of the exit surface in the sub scanning direction changes from an on-axis position to an off-axis position.

4. A light scanning device according to claim 1, wherein the incident and exit surfaces are anamorphic surfaces.

5. A light scanning device according to claim 1, wherein a shape of the incident surface in the sub scanning direction is flat or arc, and a shape of the exit surface in the sub scanning direction is arc.

6. A light scanning device according to claim 1, wherein a distance L from a deflection point where the light beam from said light source means is deflected by said deflecting means to the surface to be scanned satisfies $1.2f < L < 1.45f$ where f is a focal length of said imaging optical system.

7. A light scanning device according to claim 1, wherein there is no inflection point in a curvature change on a surface of the lens shape of said imaging optical system in the main scanning direction, which uses an aspherical surface.

8. A light scanning device according to claim 1, wherein said imaging optical system is manufactured by plastic molding.

9. A light scanning device according to claim 1, wherein a multi-beam laser is used as a light source of said imaging optical system.

10. A light scanning device according to claim 1, wherein the power of the exit surface in the sub scanning direction satisfies $0.95 \leq \phi s2/\phi s \leq 1.05$ where $\phi s$ is power of the overall imaging optical system in the sub scanning direction and $\phi s2$ is power of the exit surface in the sub scanning direction.

11. A light scanning device according to claim 1, wherein the non-arc shape of the exit surface in the main scanning direction satisfies $$0.95 \times \frac{L_{bo}}{L_{ao}} \leq \frac{L_{b\theta}}{L_{a\theta}} \leq 1.05 \times \frac{L_{bo}}{L_{ao}}$$

where $L_{ao}$ is the equivalent air distance from the deflecting means on the optical axis to the exit surface of said single lens, $L_{bo}$ is the distance from the exit surface of said single lens to the surface to be scanned, $L_{a\theta}$ is the equivalent air distance from the deflecting means at an off-axis position to the exit surface of said single lens, and $L_{b\theta}$ is the distance from the exit surface of said single lens to the surface to be scanned.

12. A light scanning device according to claim 1, wherein the shape of the exit surface of said single lens is an arc shape.

13. A light scanning device according to claim 1, wherein the shape of the incident surface of said single lens within a sub scanning section is flat.

14. An image forming apparatus comprising said light scanning device according to any one of claims 1 to 13, a photosensitive device placed on the surface to be scanned, a developing device for developing an electrostatic latent image formed on said photosensitive body by a light beam scanned by said scanning optical device as a toner image, a transferring device for transferring the developed toner image onto a transfer medium, and a fixing device for fixing the transferred toner image on the transfer medium.

15. An image forming apparatus comprising said light scanning device according to any one of claims 1 to 13, and a printer controller for converting code data input from an external device into an image signal, and inputting the signal to said scanning optical device.

16. An image forming apparatus comprising a plurality of said light scanning devices according to any one of claims 1 to 13, each of said light scanning devices recording image information on photosensitive devices corresponding to each of a plurality of colors.

17. A light scanning device having an imaging optical system for guiding a light beam emitted from light source means to a deflecting element, and forming the light beam deflected by the deflecting element into an image on a surface to be scanned, wherein said imaging optical system is formed from a single lens formed by a molding process, sectional shapes of an incident surface and an exit surface of said single lens in a main scanning direction are non-arc shapes, power of the exit surface in a sub scanning direction satisfies $0.9 \leq \phi s2/\phi s \leq 1.1$ where $\phi s$ is power of the overall imaging optical system in the sub scanning direction and $\phi s2$ is power of the exit surface in the sub scanning direction, and the non-arc shape of the exit surface in the main scanning direction satisfies $$0.9 \times \frac{L_{bo}}{L_{ao}} \leq \frac{L_{b\theta}}{L_{a\theta}} \leq 1.1 \times \frac{L_{bo}}{L_{ao}}$$

where $L_{ao}$ is an equivalent air distance from the deflecting means on an optical axis to the exit surface of said single lens, $L_{bo}$ is a distance from the exit surface of said single lens to the surface to be scanned, $L_{a\theta}$ is an equivalent air distance from the deflecting means at an off-axis position to the exit surface of said single lens, and $L_{b\theta}$ is a distance from the exit surface of said single lens to the surface to be scanned.

18. A light scanning device according to claim 17, wherein the power of the exit surface in the sub scanning direction or/and the power of the incident surface in the sub scanning direction changes without correlation to a shape in the main scanning direction.

19. A light scanning device according to claim 17, wherein a radius of curvature of the exit surface in the sub scanning direction changes from an on-axis position to an off-axis position.

20. A light scanning device according to claim 17, wherein the incident and exit surfaces are anamorphic surfaces.

21. A light scanning device according to claim 17, wherein a shape of the incident surface in the sub scanning direction is flat or arc, and a shape of the exit surface in the sub scanning direction is arc.

22. A light scanning device according to claim 17, wherein a distance L from a deflection point where the light beam from said light source means is deflected by said deflecting means to the surface to be scanned satisfies $$1.2f < L < 1.45f$$

where f is a focal length of said imaging optical system.

23. A light scanning device according to claim 17, wherein there is no inflection point in a curvature change on a surface of the lens shape of said imaging optical system in the main scanning direction, which uses an aspherical surface.

24. A light scanning device according to claim 17, wherein said imaging optical system is manufactured by plastic molding.

25. A light scanning device according to claim 17, wherein a multi-beam laser is used as a light source of said imaging optical system.

26. A light scanning device according to claim 17, wherein the power of the exit surface in the sub scanning direction satisfies $0.95 \leq \phi s2/\phi s \leq 1.05$ where $\phi s$ is power of the overall imaging optical system in the sub scanning direction and $\phi s2$ is power of the exit surface in the sub scanning direction.

27. A light scanning device according to claim 17, wherein the non-arc shape of the exit surface in the main scanning direction satisfies $$0.95 \times \frac{L_{bo}}{L_{ao}} \leq \frac{L_{b\theta}}{L_{a\theta}} \leq 1.05 \times \frac{L_{bo}}{L_{ao}}$$

where $L_{ao}$ is the equivalent air distance from the deflecting means on the optical axis to the exit surface of said single lens, $L_{bo}$ is the distance from the exit surface of said single lens to the surface to be scanned, $L_{a\theta}$ is the equivalent air distance from the deflecting means at an off-axis position to the exit surface of said single lens, and $L_{b\theta}$ is the distance from the exit surface of said single lens to the surface to be scanned.

28. A light scanning device according to claim 17, wherein the shape of the exit surface of said single lens is an arc shape.

29. A light scanning device according to claim 17, wherein the shape of the incident surface of said single lens within a sub scanning section is flat.

30. An image forming apparatus comprising said light scanning device according to any one of claims 17 to 29, a photosensitive device placed on the surface to be scanned, a developing device for developing an electrostatic latent image formed on said photosensitive body by a light beam scanned by said scanning optical device as a toner image, a transferring device for transferring the developed toner image onto a transfer medium, and a fixing device for fixing the transferred toner image on the transfer medium.

31. An image forming apparatus comprising said light scanning device according to any one of claims 17 to 29, and a printer controller for converting code data input from an external device into an image signal, and inputting the signal to said scanning optical device.

32. An image forming apparatus comprising a plurality of said light scanning devices according to any one of claims 17 to 29, each of said light scanning devices recording image information on photosensitive devices corresponding to each of a plurality of colors.

* * * * *

UNITED STATES PATENT AND TRADEMARK OFFICE
CERTIFICATE OF CORRECTION

PATENT NO. : 6,831,764 B2
DATED : December 14, 2004
INVENTOR(S) : Hidekazu Shimomura et al.

It is certified that error appears in the above-identified patent and that said Letters Patent is hereby corrected as shown below:

Column 18,
Table 3, in the last line of the far right column, "-7.91632E-18" should read
-- -7.91832E-18 --.

Column 21,
Table 6, in the first line of column "$L_{23}(\theta)$", "177.3" should read -- 177.1 --.

Column 23,
Line 31, "having an imaging optical" should read
-- comprising:
    light source means;
    a deflecting element;
    an incident optical system for guiding a light beam emitted from said
light source means to said deflecting element; and
    an imaging optical system for forming the light beam deflected by the
deflecting element into an image on a surface to be scanned, --; and
Lines 32 to 35 should be deleted.

Column 24,
Line 63, "lens" should read -- lens in the sub scanning direction --.

Column 25,
Line 19, "having an imaging optical" should read
-- comprising:
    light source means;
    a deflecting element;
    an incident optical system for guiding a light beam emitted from said
light source means to said deflecting element; and
    an imaging optical system for forming the light beam deflected by the
deflecting element into an image on a surface to be scanned, --; and
Lines 20 to 23 should be deleted.

UNITED STATES PATENT AND TRADEMARK OFFICE
CERTIFICATE OF CORRECTION

PATENT NO. : 6,831,764 B2
DATED : December 14, 2004
INVENTOR(S) : Hidekazu Shimomura et al.

It is certified that error appears in the above-identified patent and that said Letters Patent is hereby corrected as shown below:

Column 26,
Line 39, "lens" should read -- lens in the sub scanning direction --.

Signed and Sealed this

Twenty-fourth Day of May, 2005

JON W. DUDAS
*Director of the United States Patent and Trademark Office*